US005574854A

United States Patent [19]

Blake et al.

[11] Patent Number: 5,574,854
[45] Date of Patent: Nov. 12, 1996

[54] METHOD AND SYSTEM FOR SIMULATING THE EXECUTION OF A COMPUTER PROGRAM

[75] Inventors: Russell P. Blake, Carnation; Robert F. Day, Bothell, both of Wash.

[73] Assignee: Microsoft Corporation, Redmond, Wash.

[21] Appl. No.: 406,641

[22] Filed: Mar. 16, 1995

Related U.S. Application Data

[63] Continuation of Ser. No. 85,621, Jun. 30, 1993, abandoned.

[51] Int. Cl.$^6$ .............................. G06F 11/34; G06F 9/455
[52] U.S. Cl. ................. 395/183.04; 364/DIG. 1; 364/DIG. 2; 364/264; 364/264.4; 364/265; 364/265.6; 364/266; 364/267; 364/267.4; 364/280; 364/285; 364/286; 364/286.1; 364/286.2; 364/921.8; 364/927.81; 364/976; 364/976.4
[58] Field of Search ....................... 364/DIG. 1 MS File, 364/DIG. 2 MS File; 395/180, 183.01, 183.02, 183.14, 500

[56] References Cited

U.S. PATENT DOCUMENTS

| 4,696,003 | 9/1987 | Kerr et al. | 371/19 |
|---|---|---|---|
| 4,819,233 | 4/1989 | Delucia et al. | 371/19 |
| 4,819,234 | 4/1989 | Huber | 371/19 |
| 5,022,028 | 6/1991 | Edmonds et al. | 371/25.1 |
| 5,157,779 | 10/1992 | Washburn et al. | 395/575 |
| 5,157,782 | 10/1992 | Tuttle et al. | 395/575 |
| 5,159,669 | 10/1992 | Trigg et al. | 395/159 |
| 5,218,605 | 6/1993 | Low et al. | 371/16.1 |
| 5,226,162 | 7/1993 | Daw | 395/700 |
| 5,233,611 | 8/1993 | Triantafyllos et al. | 371/16.1 |
| 5,339,261 | 8/1994 | Adelson et al. | 364/570 |

FOREIGN PATENT DOCUMENTS

| 4118454A1 | 12/1991 | Germany | 11/28 |

OTHER PUBLICATIONS

Stephen W. L. Yip et al., "Applying Formal Specification and Functional Testing to Graphical User Interfaces", *Proceedings of the 5th Annual European Computer Conference*, p. 560, right column, lines 1–16, 16 May 1991.

"Tracing the Exported Entry Points in an OS/2 Dynamic Link Library", *IBM Technical Disclosure Bullein*, vol. 33, No. 6B, pp. 140–141, Nov. 1990.

"Perform", Engenious Solutions, Oakland, California (Brochure).

Printout of Help Files Stored on "Perform Demo" Diskette, Engenious Solutions, Oakland, California.

"Binary Wrapping: A Technique for Instrumenting Object Code", *ACM Sigplan Notices* 27(6), Jun. 1992.

Document Describing Usage of the API Profiler.

*Primary Examiner*—Robert B. Harrell
*Attorney, Agent, or Firm*—Seed and Berry

[57] ABSTRACT

A simulation system to simulate the execution of a computer program. The computer program is developed for invoking operating system functions of a first operating system. Each operating system function performs a behavior in accordance with passed parameters. The simulation system generates a log during the execution of the computer program under control of the first operating system. The log includes an indication of each invocation of an operating system function by the computer program and an indication of each parameter passed to the operating system function by the computer program and the current time. The logged execution is then simulated by the simulation system on a second operating system. The simulation system invokes an operating system function of the second operating system to perform a behavior similar to the behavior performed by each logged invocation of the operating system function of the first operating system in accordance with the passed parameters. Comparison of the functionality, reliability, and performance of the two systems are thereby enabled.

39 Claims, 24 Drawing Sheets

METHOD AND SYSTEM FOR SIMULATING THE EXECUTION OF A COMPUTER PROGRAM

CROSS-REFERENCE TO RELATED APPLICATION

This application is a File Wrapper Continuation of U.S. patent application Ser. No. 08/085,621, filed Jun. 30, 1993, now abandoned.

TECHNICAL FIELD

This invention relates generally to a computer method and system for simulating the execution of a computer program.

BACKGROUND OF THE INVENTION

Computer operating systems are very complex computer programs. When developing or modifying an operating system, it is critical that the operating system be thoroughly tested. The testing of an operating system typically involves several testing phases. First, the programmer who writes a program for the operating system performs "unit testing." This unit testing ensures that the program functions as intended by the programmer. Second, the programmers who developed various programs perform integration testing. This integration testing ensures that the various programs function together correctly. Third, the developer of the operating system performs alpha testing of the operating system. During alpha testing, application programs are executed with the operating system and any anomalies are logged for later correction. Finally, end users of the operating system perform beta testing. The beta testing ensures that the operating system will function correctly in the end user's environment.

The testing of an operating system can be very time consuming and expensive. Furthermore, it is virtually impossible to ensure that the operating system is error free. Generally, operating system developers concentrate on ensuring that the operating system will function correctly with "standard applications." A standard application is an application program that a typical user of the operating system may use. By testing with these standard applications, a developer can help ensure the operating system will function correctly in most typical situations.

Certain operating systems are referred to as message-driven operating systems. One such operating system is Windows 3.1, developed by Microsoft Corporation. A description of Windows 3.1 is provided in the Software Development Kit for Windows 3.1, which is available from Microsoft Corporation and is hereby incorporated by reference. The Windows operating system provides a windowing environment for applications that support a graphical user interface (GUI). FIG. 1 is a block diagram illustrating the messaging architecture of a typical message-driven operating system. An application program 110 contains a main procedure 111 and a window procedure 112. When the application program 110 is executed under the control of the operating system, control is passed to the main procedure 111. The main procedure 111 typically creates and displays a window and then enters a message loop 113. When executing the message loop, the application program 110 waits to receive a message from the operating system 120 indicating an external event (e.g., key down). The messages received by the message loop are referred to as posted messages. When a message is received, the application program 110 processes the message by requesting the operating system 120 to dispatch the message to the appropriate window procedure. The application program 110 includes a window procedure 112 for each window that is displayed on display monitor 130. A window procedure is invoked by the operating system when a message is dispatched to that window or when the operating system sends (discussed below) a message to that window. The window procedure decodes the message and processes the message accordingly. For example, a message dispatched to the window procedure may indicate that a character has been depressed on the keyboard when the window has the focus. A window that has the focus receives all keyboard and mouse inputs.

The operating system 120 provides various functions to application programs that provide services to the application programs. These functions may include: RegisterClass, CreateWindow, ShowWindow, GetMessage, DispatchMessage, and DefWindowProc. These functions are collectively referred to as the application programming interface (API) provided by the operating system, and each function may be individually referred to as an API. During execution of the application program 110, the application program invokes the various functions provided by the operating system. These functions are typically stored in a dynamic link library. When the application program is initially loaded into memory, it dynamically links to each of the functions it uses. As shown by the main procedure 111, the application program 110 initially invokes the function RegisterClass to register a window class with the operating system. Each window class has an associated window procedure for processing messages that are sent to a window. The operating system maintains a window class table 122, which correlates a window class with its window procedure. When a window class is registered, the operating system stores the address of the window procedure in the window class table 122. When a message is to be sent to a window, the operating system invokes the associated window procedure passing it various parameters including the type of the message.

A window procedure is a type of a callback routine. A callback routine is a routine that is part of the application program but is invoked directly by the operating system. The application program provides the operating system with the address of a callback routine that is developed to perform application-specific processing. The operating system then invokes the callback routine to perform the processing.

The operating system also maintains a message queue 121 for the application program 110. The message queue 121 contains messages that are posted to the application program. Each invocation of the function GetMessage in the message loop 113 retrieves a message from the message queue 121. The posted messages in the message queue typically correspond to external events such as mouse movement. When the operating system detects mouse movement over the window on the display monitor 130, the operating system posts a message to the message queue for the application program. The application program during the message loop retrieves each posted message and invokes the function DispatchMessage to process the message. The function DispatchMessage determines which window procedure the message is directed to and sends the message to that window by invoking its window procedure. Not all messages are posted, dispatched, and then sent to the window procedure. The operating system sometimes sends messages directly to a window procedure, without first posting the message to the message queue. For example, when a window is first created, the operating system may send a create message (WM_CREATE) to the window procedure for that window. This message allows the window procedure to perform initialization of the window.

SUMMARY OF THE INVENTION

It is an object of the present invention to provide a method and system for simulating the execution of a computer program to facilitate the testing of an operating system.

It is another object of the present invention to provide a method and system for testing an operating system using application programs that have not yet been converted to execute under the operating system.

These and other objects, which will become apparent as the invention is more fully described below, are provided by a method and system for simulating the execution of a computer program. In a preferred embodiment, a computer system simulates an execution of a client program that requests services of a first server program. During execution of the client program, the requests for services are logged. A simulation program receives the logged requests for services and requests a second server program to simulate the behavior of the requested service. In another preferred embodiment, a simulation system simulates the execution of a computer program. The computer program is developed for invoking operating system functions of a prior operating system. Each operating system function performs a behavior in accordance with passed parameters. The simulation system generates a log during the execution of the computer program under control of the prior operating system. The log includes an indication of each invocation of an operating system function by the computer program and an indication of each parameter passed to the operating system function by the computer program. The logged execution is then simulated on a new operating system. The simulation system invokes an operating system function of the new operating system to perform a behavior similar to the behavior performed by the logged invocation of the operating system function of the prior operating system in accordance with the passed parameters.

DETAILED DESCRIPTION OF THE INVENTION

The present invention provides a method and system for simulating the execution of an application program. In a preferred embodiment, the simulation system first records the interaction between the application program and an existing operating system (an old operating system) during an execution of the application program. The simulation system then takes this recorded interaction and simulates the interaction with a new operating system.

To record the interaction, the simulation system executes the application program under the control of the old operating system. During execution of the application program, a logger portion of the simulation system records each invocation of an operating system function by the application program and records each invocation of a callback routine by the operating system. The logger also records all the parameters passed to each function and all the parameters returned by each callback routine. The logger also preferably records all parameters returned by each function and all parameters passed to each callback routine. The logger records this information in a log file.

The simulation system then simulates the execution of the application program on a new operating system. A synthetic GUI application (SGA) of the simulation system inputs the log file and invokes the functions of the new operating system to effect the behavior of the logged function invocations. The SGA also provides thunk callback routines for the new operating system to invoke. The thunk callback routines simulate the behavior of the real callback routines of the application program. The SGA also simulates the occurrence of the real events (e.g., key down) that occurred during the execution of the application program. By effecting a behavior in the new operating system that corresponds to the behavior that occurred during the execution of the application program under the old operating system, the execution of the application program on the new operating system is simulated.

Testers of the new operating system can then compare the output of the simulation to ensure that it correctly corresponds to the execution of the application program under the old operating system. Also, the return parameters from the functions of the new operating system can be compared to the recorded returned parameters from the function of the old operating system to determine whether the new operating system is working correctly. Also, the time taken to perform the functions on the new operating system can be compared to the time taken to perform the functions in the old operating system.

Figure 1:
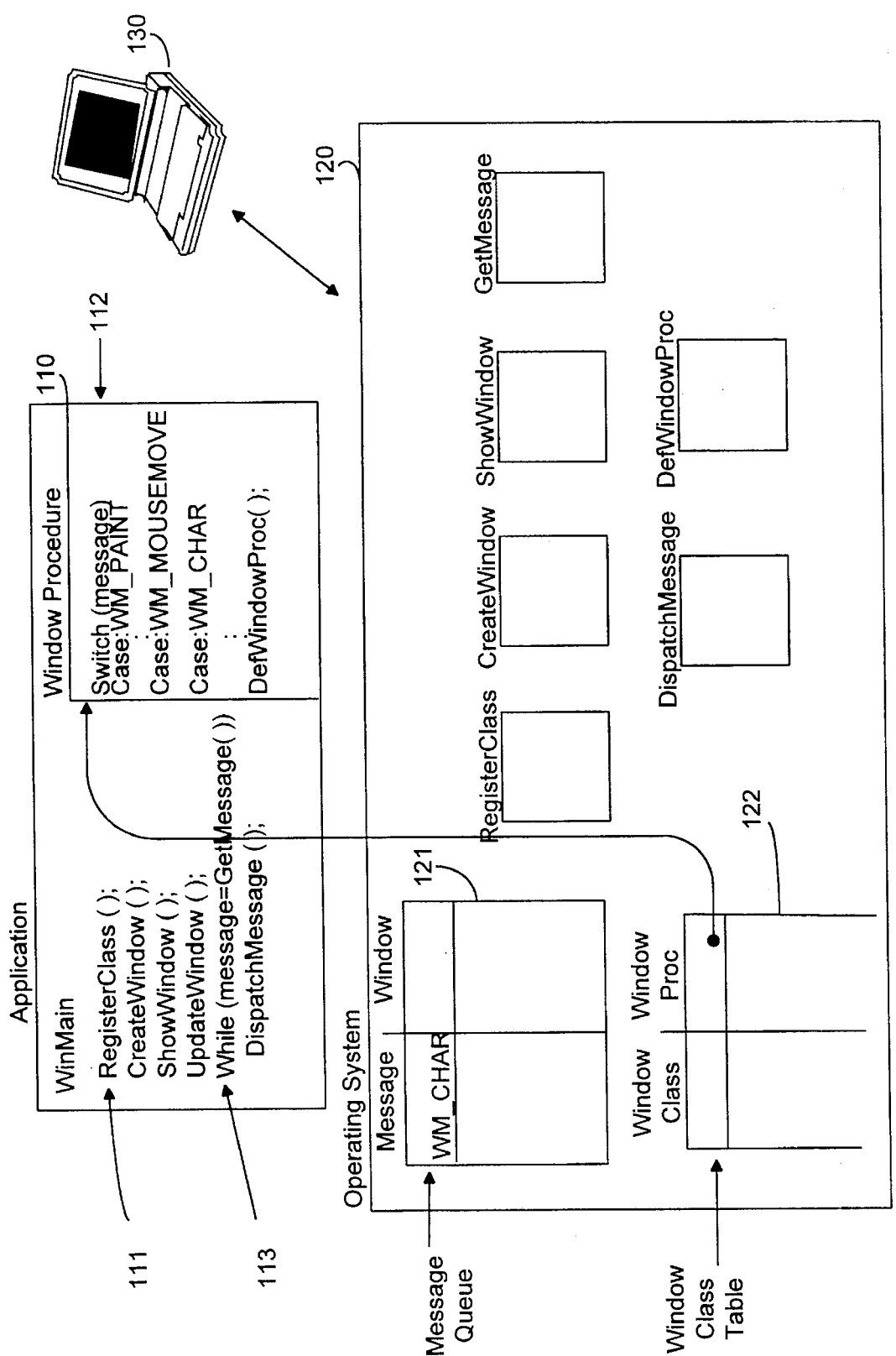
FIG. 1 is a block diagram illustrating the messaging architecture of a typical message-driven operating system.
Figures 2A, 2B, 2C:
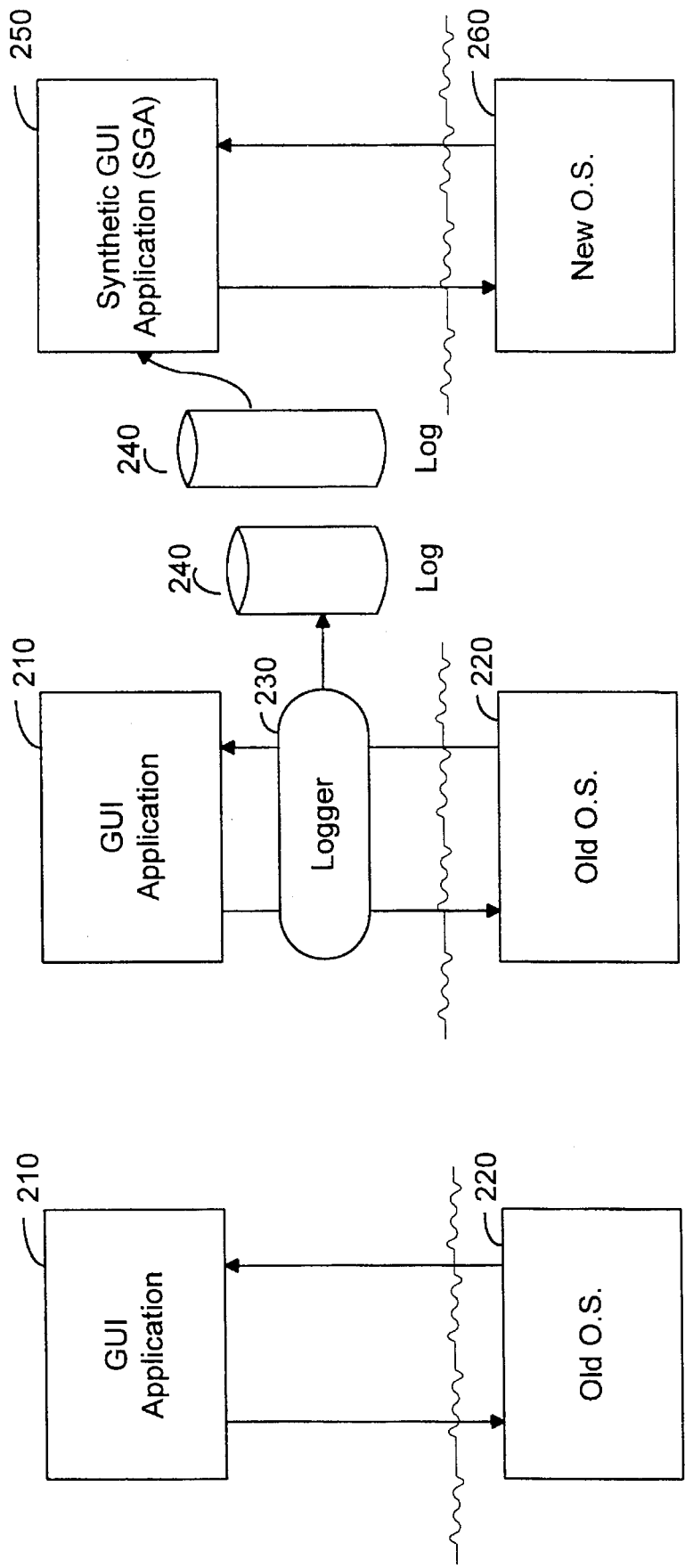
FIGS. 2A, 2B, and 2C are block diagrams illustrating the recording of the interaction and the simulation of an application program.

FIGS. 2A, 2B, and 2C are block diagrams illustrating the recording of the interaction and the simulation of an application program. FIG. 2A illustrates the interaction between application program 210 and an old operating system 220. The GUI application program 210 invokes the functions of the old operating system 220, and the old operating system 220 invokes the callback routines of the GUI application program 210. FIG. 2B illustrates the logging of the invocations of the functions and the callback routines during the execution of the application program 210. When the application program 210 invokes a function, the logger 230 records the passed parameters for the function and the function name to a log file 240. When the function returns to the application program, the logger also records all returned parameters to the log file. When the old operating system 220 invokes a callback routine, the logger 230 records a callback routine identifier and the passed parameters. When the callback routine returns to the old operating system 220, the logger records the returned parameters to the log file. The time associated with each interaction is recorded. FIG. 2C is a block diagram illustrating the simulation of the execution of the application program 210 that is recorded in the log file. To simulate the execution of the application program 210, the synthetic GUI application 250 (SGA) inputs the log file that records the execution. The SGA simulates each function invocation represented in the log file by invoking none, one, or more functions of the new operating system 260. The SGA simulates the behavior of the function invocation based on the recorded passed parameters. The SGA 250 also provides a thunk callback routine for each real callback routine of the application program. The SGA 250 passes these thunk callback routines to the new operating system 260. When the new operating system 260 invokes a thunk callback routine, the thunk callback routine simulates the processing of the real callback routine based on the information in the log file. Specifically, the thunk callback routine may simulate the posting and sending of messages and the invoking of functions that occurred during the execution of the real callback routine.

The Logger

Figure 3:
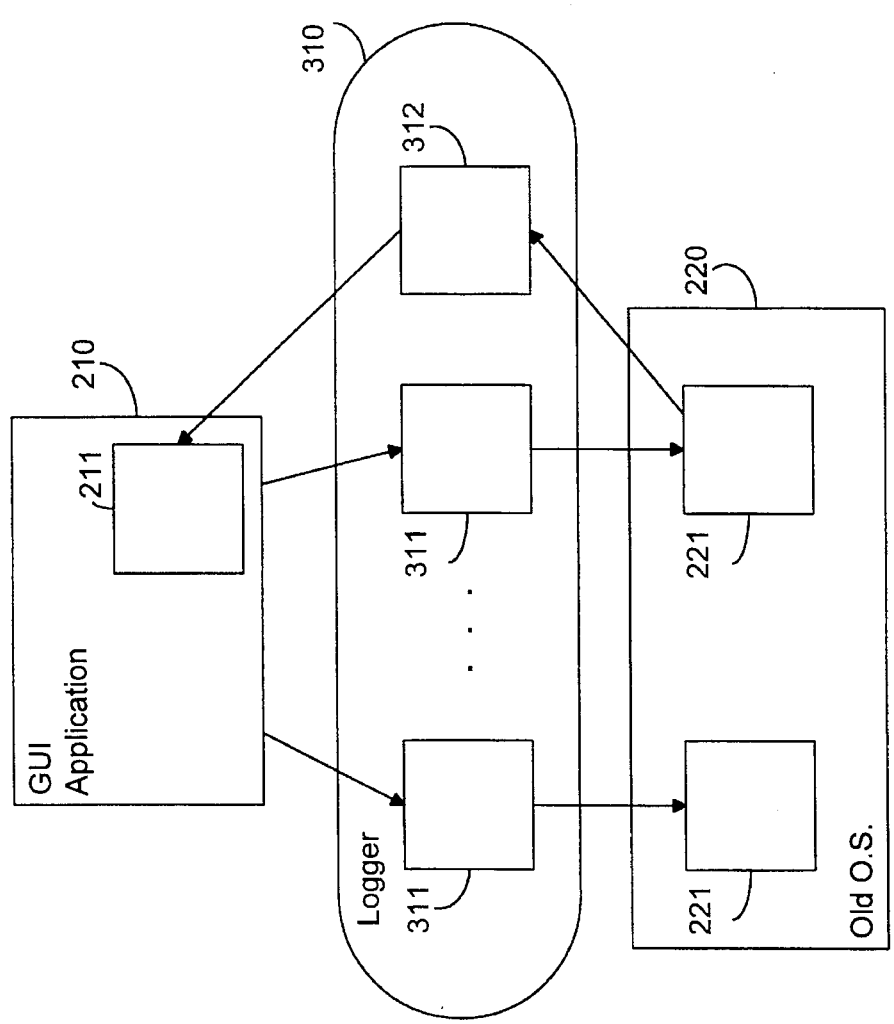
FIG. 3 is a block diagram illustrating a preferred architecture of the logger.

FIG. 3 is a block diagram illustrating a preferred architecture of the logger. For each function 221 that the old operating system 220 provides, the logger provides a substitute function 311. The logger also provides a substitute callback routine 312 for each callback routine of the application program. When the GUI application program 210 is initially loaded, all function calls by the application program link to a substitute function 311, rather than the real function 221 in the old operating system. When the application program 210 invokes a function, the substitute function records the invocation to a log file along with each passed parameter and the current time. The substitute function then invokes the real function of the old operating system 220 with the passed parameters. When the real function returns to the substitute function, the substitute function records the return along with the returned parameters to the log file and the current time. The substitute function then returns to the application program with the parameters returned by the real function. In this way, the recording of the log file is functionally transparent to the application program.

The real functions of the old operating system are typically stored in a dynamic link library. The executable file containing the application program contains the name of each dynamic link library that the application program invokes. During initial loading of the application program, each invocation of a real function is bound to the real function in the dynamic link library. In a preferred embodiment, each dynamic link library with real functions is associated with a substitute dynamic link library and is given a name with the same number of characters as the name of the "real" dynamic link library and a slight variation of the name of the real dynamic link library. For example, the name "Zernel" may be given to the substitute dynamic link library corresponding to the real dynamic link library "Kernel." When the execution of the application program is to be logged, each real dynamic link library name in the executable file is replaced by a substitute dynamic link library name. Thus, when the application program is loaded, the application program dynamically links to the substitute dynamic link libraries, rather than the real dynamic link libraries.

The addresses of callback routines are typically specified to the old operating system by a parameter passed to a function. For example, the address of a window procedure callback routine is specified to the old operating system as a parameter when invoking the function RegisterClass. The substitute function associated with each real function, that is passed as a callback routine, substitutes a substitute callback routine for the real callback routine. The substitute function invokes the real function specifying the substitute callback routine 312 rather than the real callback routine 211. When the old operating system 220 sends a message to the application program 210, it invokes the substitute callback routine 312. The substitute callback routine records the invocation of the callback routine along with the passed parameters and the current time. The substitute callback routine then invokes the real callback routine 211 with the passed parameters. When the real callback routine returns to the substitute callback routine, the substitute callback routine records the return along with the returned parameters. The substitute callback routine then returns to the old operating system with the returned parameters.

When a substitute function or a substitute callback routine records its invocation, it also records a nesting level. The nesting level indicates the level of invocations of the functions and callback routines. For example, when an application program invokes the function DispatchMessage, the nesting level is 1 because no other function or callback routine is currently invoked. If, during the execution of the function DispatchMessage, the function invokes a callback routine, then the nesting level of the callback routine is 2. If that callback routine then invokes a function (e.g., function DefWindowProc), then the invocation of that function is at nesting level 3. If the function at nesting level 3 invokes a callback routine, then the nesting level of the callback routine is 4, and so on. Alternatively, the nesting level of an invocation can be determined from the log after completion of the execution of the application program, rather than during execution.

Figure 4:
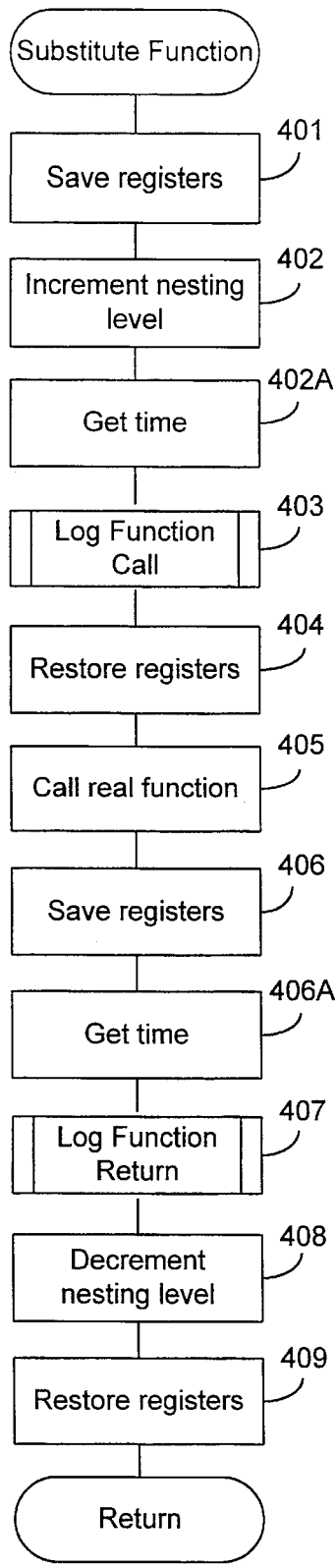
FIG. 4 is a flow diagram of a sample substitute function.

FIG. 4 is a flow diagram of a sample substitute function. The substitute function has the same calling prototype (that is, the same function type and the same number and type of parameters) as the real function. In a preferred embodiment, the substitute function is generated automatically from a "header" file that defines the original function to the application. The substitute function records the invocation of the function along with the passed parameters and the current time and the return of the function along with the returned parameters and the current time. The substitute function invokes the real function. The substitute function ensures that the real function is passed the same parameters that it receives, and ensures that the application program is returned the same parameters that the real function returns. In step 401, the substitute function saves the current state of the CPU, which may include saving the registers. The substitute function ensures that CPU state is restored to this saved state before the real function is invoked. In step 402, the substitute function increments the nesting level. In step 402A, the substitute function retrieves the current time. In step 403, the substitute function records the function invocation and passed parameters and the current time. In step 404, the substitute function restores the state of the CPU to the state saved in step 401. In step 405, the substitute function invokes the real function with the passed parameters. In step 406, the substitute function saves the state of the CPU upon return from the real function. The substitute function ensures that the CPU state is restored to this saved state before the substitute function returns. In step 406A, the substitute function retrieves the current time. In step 407, the substitute function records the return and returned parameters and the current time. In step 408, the substitute function decrements the nesting level. In step 409, the substitute function restores the CPU state saved in step 406 and returns to the application program.

Figure 5:
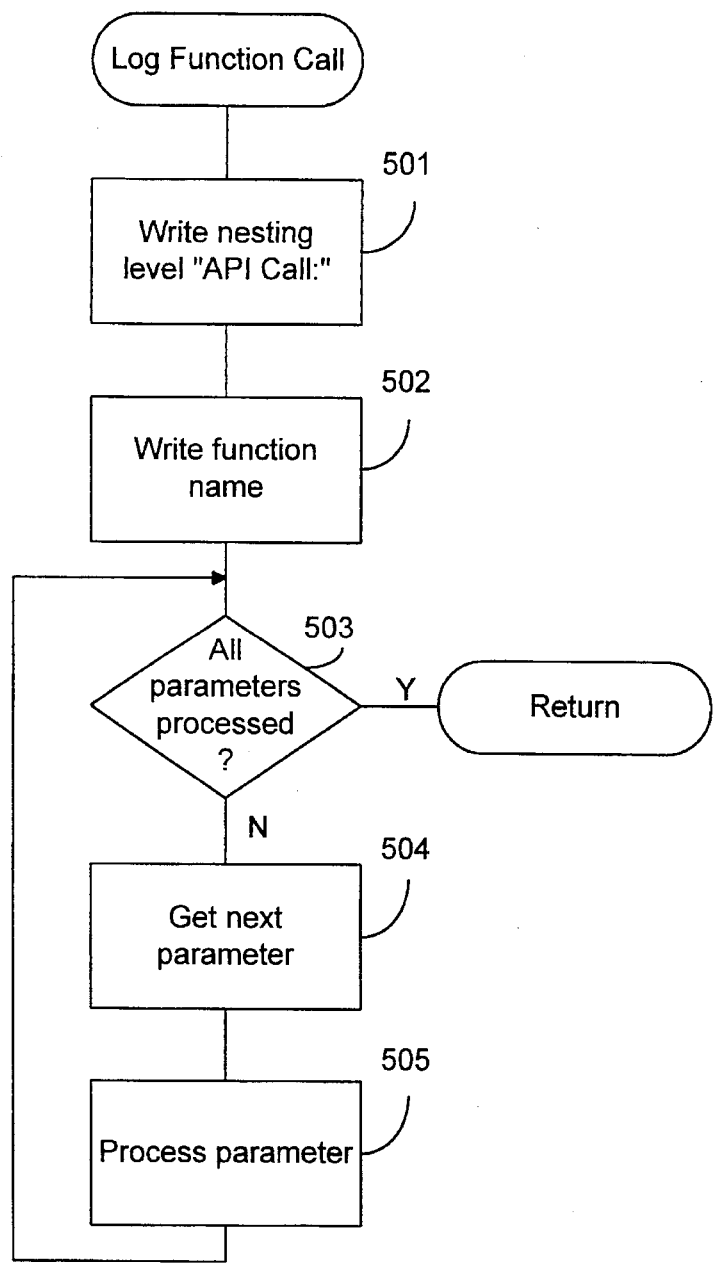
FIG. 5 is a flow diagram of a routine to log a function invocation.

FIG. 5 is a flow diagram of a routine to record a function invocation to a log file. The routine writes an identification of the real function (e.g., function name) to the log file along with all the parameters passed to the real function and the current time. The log file preferably includes an entry (e.g., a line) for each recorded invocation and return of a function or callback routine. Each entry identifies whether it corresponds to an invocation or return of a function or callback routine. In step 501, the routine writes the nesting level and function invocation identifier (e.g., "APICALL") to the log file and the current time. In step 502, the routine writes the function name (e.g., "RegisterClass") to the log file. In steps 503 through 505, the routine loops writing the passed parameters to the log file. The routine must write all the information to the log file that the real function may use when it executes. For example, if the real function prints a buffer of data to the display monitor, then the buffer may be pointed to by a pointer. The routine copies all the data in the buffer to the log file, not just the pointer. This actual data can then be redisplayed during simulation. In step 503, if all the parameters have been processed, then the routine returns, else the routine continues at step 504. In step 504, the routine retrieves the next parameter. In step 505, the routine processes the retrieved parameter and writes the data associated with the parameter to the log file, and then loops to step 503.

Figure 6:
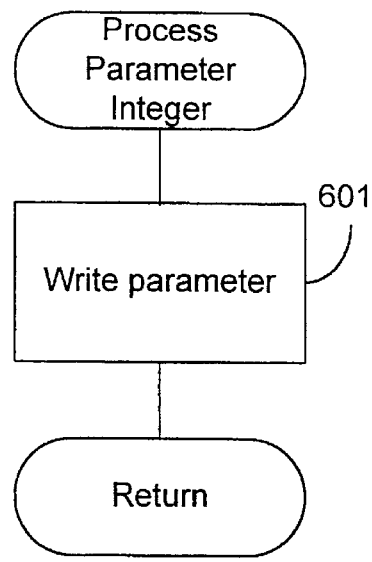
FIG. 6 is a flow diagram illustrating the recording of a typical integer parameter that is passed by value.

FIG. 6 is a flow diagram illustrating the recording of a typical integer parameter that is passed by value. The value of the parameter is retrieved and written to the log file.

Figure 7:
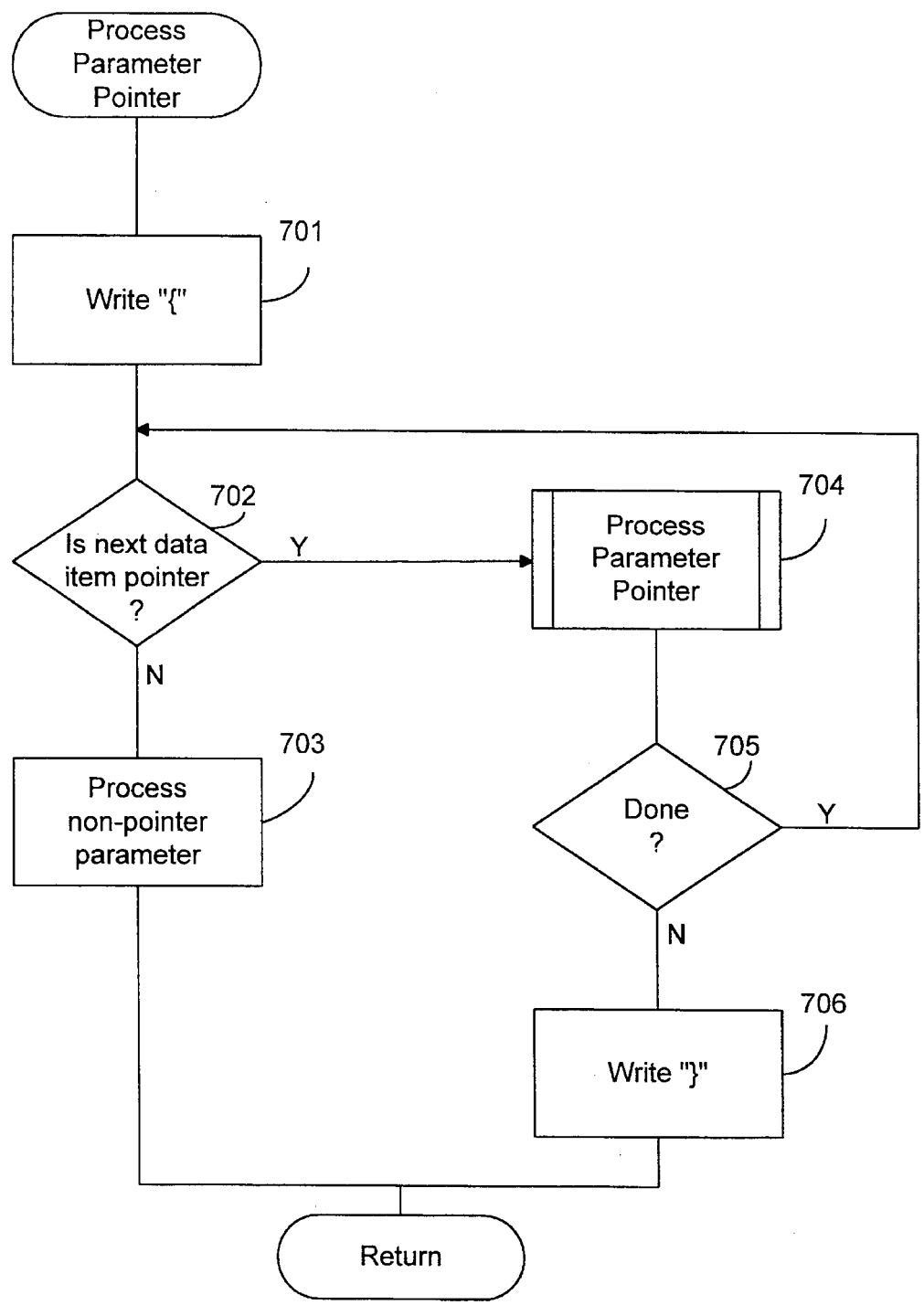
FIG. 7 is a flow diagram illustrating a routine that records a parameter that is passed as a pointer to a buffer.

FIG. 7 is a flow diagram illustrating a routine that records a parameter that is passed as a pointer to a buffer. The routine not only records the data pointed to by the passed pointer (the buffer), but also records any data pointed to by pointers in the buffer. In step 701, the routine writes a left brace to the log file. The left brace indicates the start of data that is pointed to. In step 702, if the next data item is a pointer, then the routine continues at step 704, else the routine continues at step 703. In step 703, the routine writes the non-pointer parameter to the log file. In step 704, the routine recursively calls itself to process the pointer. In step 705, if all the parameters have been processed, then the routine continues at step 706, else the routine loops to step 702. In step 706, the routine writes a right brace to the log file and returns.

Figure 8:
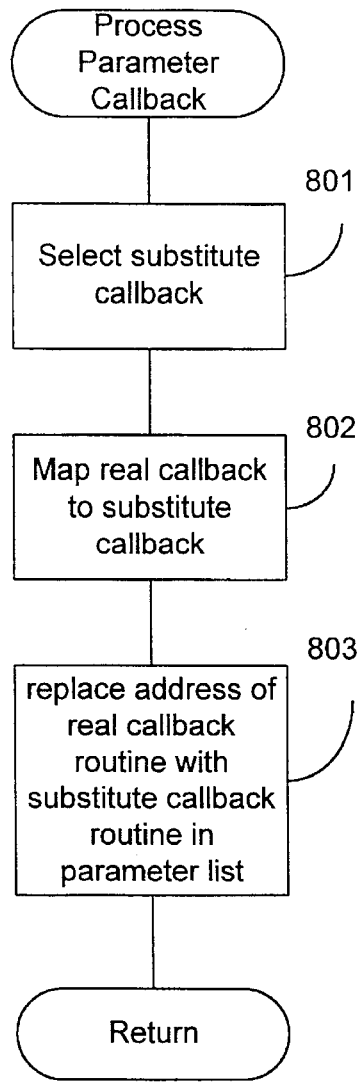
FIG. 8 is a flow diagram of the processing of a parameter that points to a callback routine.

FIG. 8 is a flow diagram of the processing of a parameter that points to a callback routine. In a preferred embodiment, each substitute function that is passed a callback routine includes an array of substitute callback routines. Each time the substitute function is invoked, it selects the next substitute callback routine in the array as the substitute for the passed callback routine. The substitute function also maintains a table that correlates each real callback routine to its substitute callback routine. For example, the substitute function for the function RegisterClass preferably contains an array of identical substitute window procedures. When each new window class is registered, the next unused substitute window procedure in the array is selected. Alternatively, a substitute function could create the substitute callback routines as needed. In step 801, the routine selects an unused substitute callback routine. In step 802, the routine maps the real callback routine to the substitute callback routine. In step 803, the routine substitutes the address of the substitute callback routine for the address of the real callback routine in the parameter list and returns.

Figure 9:
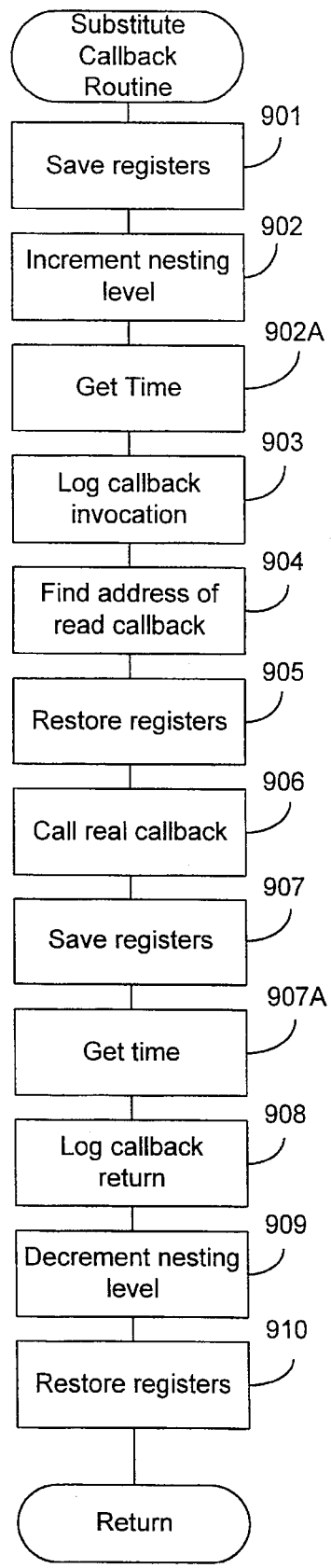
FIG. 9 is a flow diagram of a typical substitute callback routine.

FIG. 9 is a flow diagram of a typical substitute callback routine. The typical substitute callback routine is analogous to the typical substitute function as shown in FIG. 4. In step 901, the substitute callback routine saves the CPU state. In step 902, the substitute callback routine increments the nesting level. In step 902A, the substitute callback routine retrieves the current time. In step 903, the substitute callback routine records the invocation of the callback routine along with the passed parameters and current time to the log file. In step 904, the substitute callback routine finds the address of the associated real callback routine. In step 905, the substitute callback routine restores the CPU state to the state that was saved in step 901. In step 906, the substitute callback routine invokes the real callback routine. In step 907, the substitute callback routine saves the CPU state returned by the real callback routine. In step 907A, the substitute callback routine retrieves the current time. In step 908, the substitute callback routine records the return of the callback routine along with the returned parameters and current time to the log file. In step 909, the substitute callback routine decrements the nesting level. In step 910, the substitute callback routine restores the CPU state to the state that was saved in step 907 and the substitute callback routine returns to the invocation by the operating system.

Table 1 contains a sample application program written in the "C" programming language. The application program creates and displays an instance of a window class named "Generic2Class" with the window procedure named "MainWndProc". The window procedure handles the messages WM_COMMAND, WM_DESTROY, WM_PAINT, AND WM_LBUTTONDOWN. All other messages are passed by the window procedure to the operating system using the function DefWindowProc. The window procedure when sent a WM_COMMAND message with the IDM_ABOUT parameter invokes the function DialogBox with a pointer to the callback routine to handle messages to the dialog box.

Table 2 contains a section of a log file for an execution of the sample application program of Table 1. Table 2 contains an entry (line) for each function and callback routine invocation and return. Each entry contains a line number (for reference), a nesting level, a vertical bar, timing information, another vertical bar, an identifier of the type of entry, the function name or callback routine identifier, and the parameters. For example, line number 7 contains an entry corresponding to an invocation of the function CreateWindow. The nesting level is 1. The function was invoked at time "842102B3". The entry type is "APICALL", which indicates the invocation of a function. The parameters are "Generic2Class", "Generic Sample Application", "CF00", etc. The entry corresponding to the return of the function CreateWindow is at line 24. Note that each nesting level in between lines 7 and 24 is at a level greater than 1. During the invocation of the function CreateWindow, the operating system sent the message "WM_GETMINMAXINFO" to the callback routine passed to the function CreateWindow as indicated at line 8. An entry type corresponding to the invocation of a callback routine is "MSGCALL".

Table 1

```
/********************************************************************
    PROGRAM: Generic.c PURPOSE: Generic template for Windows applications

FUNCTIONS:

WinMain() - calls initialization function, processes message loop
            InitApplication() - initializes window data and registers window
            InitInstance() - saves instance handle and creates main window
            MainWndProc() - processes messages
            About() - processes messages for "About" dialog box
```

```
     COMMENTS:

Windows can have several copies of your application running at the
     same time. The variable hInst keeps track of which instance this
 5   application is so that processing will be to the correct window.

**********************************************************************/

HANDLE hInst;                    /* current instance                  */
10   HWND    hWndSave;

/*********************************************************************

FUNCTION: WinMain(HANDLE, HANDLE, LPSTR, int)
15
     PURPOSE: calls initialization function, processes message loop

COMMENTS:

20        Windows recognizes this function by name as the initial entry point
          for the program. This function calls the application initialization
          routine, if no other instance of the program is running, and always
          calls the instance initialization routine. It then executes a message
          retrieval and dispatch loop that is the top-level control structure
25        for the remainder of execution. The loop is terminated when a WM_QUIT
          message is received, at which time this function exits the application
          instance by returning the value passed by PostQuitMessage().

If this function must abort before entering the message loop, it
30        returns the conventional value NULL.

**********************************************************************/

MSG MyMsg = {0};
35
     MMain( hInstance, hPrevInstance, lpCmdLine, nCmdShow )

MSG     msg;
          HDC     hdc;
40
          if (!hPrevInstance)                /* Other instances of app running? */
               if (!InitApplication(hInstance)) /* Initialize shared things */
                    return (FALSE);           /* Exits if unable to initialize  */

45        /* Perform initializations that apply to a specific instance */ if (!InitInstance(hInstance, nCmdShow))
               return (FALSE);

50        /* Acquire and dispatch messages until a WM_QUIT message is received. */
          while ( GetMessage(&msg, NULL, 0,0) ) {
               MyMsg = msg;
               TranslateMessage(&msg);
               DispatchMessage(&msg);
55        }
     }
```

```
/***********************************************************************

FUNCTION: InitApplication(HANDLE)

PURPOSE: Initializes window data and registers window class

COMMENTS:

This function is called at initialization time only if no other
        instances of the application are running. This function performs
        initialization tasks that can be done once for any number of running
        instances.

In this case, we initialize a window class by filling out a data
        structure of type WNDCLASS and calling the Windows RegisterClass()
        function. Since all instances of this application use the same window
        class, we only need to do this when the first instance is initialized.

***********************************************************************/

BOOL InitApplication(hInstance)
HANDLE hInstance;                          /* current instance        */
{
    WNDCLASS wc;

/* Fill in window class structure with parameters that describe the   */
    /* main window.                                                       */ wc.style = CS_OWNDC; /* Class style(s).                */
    wc.lpfnWndProc = MainWndProc;     /* Function to retrieve messages for */
                                      /* windows of this class.       */
    wc.cbClsExtra = 0;            /* No per-class extra data.     */
    wc.cbWndExtra = 4;            /* No per-window extra data.    */
    wc.hInstance = hInstance;     /* Application that owns the class.  */
    wc.hIcon = LoadIcon(NULL, IDI_APPLICATION);
    wc.hCursor = LoadCursor(NULL, IDC_ARROW);
    wc.hbrBackground = GetStockObject(WHITE_BRUSH);
    wc.lpszMenuName = "GenericMenu";   /* Name of menu resource in .RC file. */
    wc.lpszClassName = "Generic2Class"; /* Name used in call to CreateWindow. */

/* Register the window class and return success/failure code. */ return (RegisterClass(&wc));

}

/***********************************************************************

FUNCTION: InitInstance(HANDLE, int)

PURPOSE: Saves instance handle and creates main window
```

COMMENTS:

This function is called at initialization time for every instance of
this application. This function performs initialization tasks that
cannot be shared by multiple instances.

In this case, we save the instance handle in a static variable and
create and display the main program window.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

```
BOOL InitInstance(hInstance, nCmdShow)
    HANDLE     hInstance;      /* Current instance identifier.    */
    int        nCmdShow;       /* Param for first ShowWindow() call. */
{
    HWND       hWnd;           /* Main window handle.             */
    HWND       hWndX;
    OFSTRUCT   ofFileData;
    HANDLE     hLogFile;

/* Save the instance handle in static variable, which will be used in */
    /* many subsequence calls from this application to Windows.           */ hLogFile = OpenFile( "DATA.TXT",
            (LPOFSTRUCT)&ofFileData,
            OF_CREATE | OF_WRITE | OF_SHARE_DENY_NONE );
    _lclose( hLogFile );

hInst = hInstance;

/* Create a main window for this application instance. */ hWnd = CreateWindow(
        "Generic2Class",            /* See RegisterClass() call.      */
        "Generic Sample Application",  /* Text for window title bar.  */
        WS_OVERLAPPEDWINDOW,        /* Window style.                  */
        0,                          /* Default horizontal position.   */
        0,                          /* Default vertical position.     */
        0x280,                      /* Default width.                 */
        0x1A5,                      /* Default height.                */
        NULL,                       /* Overlapped windows have no parent. */
        NULL,                       /* Use the window class menu.     */
        hInstance,                  /* This instance owns this window. */
        NULL                        /* Pointer not needed.            */
    );
    hWndSave = hWnd;

/* If window could not be created, return "failure" */ if (!hWnd)
        return (FALSE);

/* Make the window visible; update its client area; and return "success" */

ShowWindow(hWnd, nCmdShow);  /* Show the window           */
    UpdateWindow(hWnd);          /* Sends WM_PAINT message    */
```

```
            return (TRUE);      /* Returns the value from PostQuitMessage */

}

/******************************************************************************

FUNCTION: MainWndProc(HWND, unsigned, WORD, LONG)

PURPOSE:  Processes messages

MESSAGES:

WM_COMMAND    - application menu (About dialog box)
                WM_DESTROY    - destroy window

COMMENTS:

To process the IDM_ABOUT message, call MakeProcInstance() to get the
                current instance address of the About() function.  Then call Dialog
                box which will create the box according to the information in your
                generic.rc file and turn control over to the About() function.  When
                it returns, free the intance address.

******************************************************************************/ ifdef WIN16
typedef DWORD ULONG;
typedef DWORD BOOLEAN;

typedef struct large_integer {
    ULONG  LowPart;
    LONG   HighPart;
} LARGE_INTEGER, FAR *LPLARGE_INTEGER;

VOID RtlConvertLongToLargeInteger(
    LPLARGE_INTEGER lpli,
    LONG l
) {
    if ( l < 0 ) {
        lpli->HighPart = -1L;
    } else {
        lpli->HighPart = 0L;
    }
    lpli->LowPart = (ULONG)l;
}

VOID RtlLargeIntegerSubtract(
    LPLARGE_INTEGER lpliResult,
    LPLARGE_INTEGER lpliSubtrahend,
    LPLARGE_INTEGER lpliMinuend
) {
    lpliResult->LowPart = lpliSubtrahend->LowPart - lpliMinuend->LowPart;
    if ( (LONG)(lpliResult->LowPart) < 0 ) {
        lpliResult->HighPart = (lpliSubtrahend->HighPart-1) - lpliMinuend->HighPart;
    } else {
        lpliResult->HighPart = lpliSubtrahend->HighPart - lpliMinuend->HighPart;
```

```
        }
    } define RtlLargeIntegerGreaterThan(X,Y) ( \
        (X).HighPart > (Y).HighPart ? TRUE : \
        (X).HighPart < (Y).HighPart ? FALSE : \
        (X).LowPart > (Y).LowPart ? TRUE :   \
        FALSE )

#define RTLCONVERTLONGTOLARGEINTEGER( x, y )   RtlConvertLongToLargeInteger( &(x), y
    )
    #define RTLLARGEINTEGERSUBTRACT( x, y, z )     RtlLargeIntegerSubtract( &(x), &(y), &(z) )

#else
    #define RTLCONVERTLONGTOLARGEINTEGER( x, y )   x = RtlConvertLongToLargeInteger( y )
    #define RTLLARGEINTEGERSUBTRACT( x, y, z )     x = RtlLargeIntegerSubtract( y, z )
    #endif BOOL fmsgTime = FALSE;
    int msgCount = 0;
    int msgArray[100] = {0};
    LARGE_INTEGER msgTime[100] = {0};
    LPOUTLINETEXTMETRIC lp;

long FAR PASCAL MainWndProc(hWnd, message, wParam, lParam)
    HWND hWnd;              /* window handle              */
    UINT message;           /* type of message            */
    WPARAM wParam;                  /* additional information     */
    LONG lParam;            /* additional information     */
    {
        FARPROC lpProcAbout;        /* pointer to the "About" function */
        PAINTSTRUCT ps;
        long  rc;
        int   i;
        LARGE_INTEGER  liFreq;

switch (message) {
            case WM_COMMAND:    /* message: command from application menu */
            switch( wParam ) {
                case IDM_ABOUT:
                    lpProcAbout = MakeProcInstance(About, hInst);

DialogBox(hInst,   /* current instance       */
                        "AboutBox",    /* resource to use    */
                        hWnd,          /* parent handle      */
                        lpProcAbout);  /* About() instance address */

FreeProcInstance(lpProcAbout);
                    break;         /* Lets Windows process it   */
                case IDM_DIV0:
                    {
                        int i,j ;
                        char text[50];
                        i = 5;
```

```
                while ( i >= 0 ) {
                    j = 360/i;
                    wsprintf(text,"I = %d, j = %d\n", i, j );
                    --i;
                }
            }
            break;
        default:
            return (DefWindowProc(hWnd, message, wParam, lParam));
    } case WM_DESTROY:        /* message: window being destroyed */

PostQuitMessage(0);
        break;

case WM_PAINT:
        {
            WNDCLASS wc;
            LPSTR    lp;
            HDC      hDC;
            PAINTSTRUCT ps;
            char     text[100];
                HWND    hwnd2;
            ATOM     Atom;
            int      rc;
            HBRUSH   hbr;
            LPSTR    lpstr;
            int      x;
            int      y;

hDC = BeginPaint( hWnd, &ps );

lpstr = (LPSTR)"Hi There";

hbr = CreateSolidBrush( RGB(0x30,0x30,0) );
            GrayString( hDC, hbr, (GRAYSTRINGPROC)NULL, (LPARAM)lpstr, 0, 10, 10, 0, 0 );

SetBkMode( hDC, TRANSPARENT );
                SetTextColor( hDC, RGB(0,0,0) );

x = 150; y = 150;

TextOut( hDC, x-1, y-1, "Testing 2", 9 );
            TextOut( hDC,  x,  y-1, "Testing 2", 9 );
            TextOut( hDC, x+1, y-1, "Testing 2", 9 );
            TextOut( hDC, x-1,  y,  "Testing 2", 9 );
            TextOut( hDC, x+1,  y,  "Testing 2", 9 );
            TextOut( hDC, x-1, y+1, "Testing 2", 9 );
            TextOut( hDC,  x,  y+1, "Testing 2", 9 );
            TextOut( hDC, x+1, y+1, "Testing 2", 9 );

SetTextColor( hDC, RGB(0xFF,0xFF,0xFF) );
            TextOut( hDC, x, y, "Testing 2", 9 );

EndPaint( hWnd, &ps );
```

```
            }
            break;

case WM_LBUTTONDOWN:
            {
                unsigned short i;
                unsigned short j;

j = 1;
                while ( j <= 200 ) {
                    i = 1;
                    while ( i ) {
                        _asm { mov dx,ax };

i++;
                    }
                    j++;
                }
            } default:                    /* Passes it on if unproccessed   */
            rc = DefWindowProc(hWnd, message, wParam, lParam);
            return( rc );
        }
        return (NULL);
    }

/****************************************************************************

FUNCTION: About(HWND, unsigned, WPARAM, LONG)

PURPOSE: Processes messages for "About" dialog box

MESSAGES:

WM_INITDIALOG - initialize dialog box
        WM_COMMAND    - Input received

COMMENTS:

No initialization is needed for this particular dialog box, but TRUE
        must be returned to Windows.

Wait for user to click on "Ok" button, then close the dialog box.

****************************************************************************/

BOOL FAR PASCAL About(hDlg, message, wParam, lParam)
HWND hDlg;                  /* window handle of the dialog box */
UINT message;               /* type of message           */
WPARAM wParam;                              /* message-specific information  */
LONG lParam;
{
```

```
        switch (message) {
            case WM_INITDIALOG:              /* message: initialize dialog box */
                return (TRUE);

case WM_COMMAND:                 /* message: received a command */
                if (wParam == IDOK           /* "OK" box selected?           */
                || wParam == IDCANCEL) {     /* System menu close command? */
                    EndDialog(hDlg, TRUE);   /* Exits the dialog box        */
                    return (TRUE);
                }
                break;
        }
        return (FALSE);                      /* Didn't process a message    */
    }
```

TABLE 2

LOG FILE

```
1   01|842053E6|APICALL:RegisterClass {20 0B3F0208  0 4 B1E B6E 19E 5C "GenericMenu"
    "Generic2Class" }  0A1F0117
2   01|84206B9B|APIRET:RegisterClass C03E
3   01|84206EFA|APICALL:OpenFile "TIME.LOG"  {2 1A B1F D7 A7 0 0 }  1041
4   01|8420CF03|APIRET:OpenFile 5  {21 1 0 C2 1A F8 71 44 3A 5C 54 45 53 54 53 5C 47
    45 4E 45 52 49 43 5C 54 49 4D 45 2E 4C 4F 47 0 }
5   01|8420DAED|APICALL:_lclose 5
6   01|8420E570|APIRET:_lclose 0
7   01|842102B3|APICALL:CreateWindow "Generic2Class" "Generic Sample Application"
    CF0000 0 0 280 1A5 0 0 B1E 0
8   02|842149C5|MSGCALL:0B3F0208  8A 24-WM_GETMINMAXINFO 0 {24 24} {408 308} {FFFC
    FFFC} {66 1A} {408 308}
9   03|84214FBC|APICALL:DefWindowProc 8A 24-WM_GETMINMAXINFO 0 {24 24} {408 308} {FFFC
    FFFC} {66 1A} {408 308}
10  03|842155B0|APIRET:DefWindowProc 0
11  02|842158D6|MSGRET:0 0B3F0208  8A 24-WM_GETMINMAXINFO 0 {24 24} {408 308} {FFFC
    FFFC} {66 1A} {408 308}
12  02|8421662B|MSGCALL:0B3F0208  8A 81-WM_NCCREATE 0 {0 B1E 89 0 1A5 280 0 0 CF0000
    "Generic Sample Application" "Generic2Class"  0}
13  03|84216EA3|APICALL:DefWindowProc 8A 81-WM_NCCREATE 0 {0 B1E 89 0 1A5 280 0 0
    CF0000 "Generic Sample Application" "Generic2Class"  0}
14  03|84217B11|APIRET:DefWindowProc 1
15  02|84217E49|MSGRET:1 0B3F0208  8A 81-WM_NCCREATE 0 {0 B1E 89 0 1A5 280 0 0 CF0000
    "Generic Sample Application" "Generic2Class"  0}
16  02|842188CF|MSGCALL:0B3F0208  8A 83-WM_NCCALCSIZE 0 {0 0 280 1A5}
17  03|84218CC7|APICALL:DefWindowProc 8A 83-WM_NCCALCSIZE 0 {0 0 280 1A5}
18  03|842199AD|APIRET:DefWindowProc 0
19  02|84219CE0|MSGRET:0 0B3F0208  8A 83-WM_NCCALCSIZE 0 {4 2A 27C 1A1}
20  02|8421A4DB|MSGCALL:0B3F0208  8A 1-WM_CREATE 0 {0 B1F 89 0 1A5 280 0 0 CF0000
    "Generic Sample Application" "Generic2Class"  0}
21  03|8421AC7F|APICALL:DefWindowProc 8A 1-WM_CREATE 0 {0 B1E 89 0 1A5 280 0 0 CF0000
    "Generic Sample Application" "Generic2Class"  0}
22  03|8421B49C|APIRET:DefWindowProc 0
23  02|8421B7AE|MSGRET:0 0B3F0208  8A 1-WM_CREATE 0 {0 B1E 89 0 1A5 280 0 0 CF0000
    "Generic Sample Application" "Generic2Class"  0}
24  01|8421C18A|APIRET:CreateWindow 8A {0 0 280 1A5} {0 0 280 1A5}
```

```
25  01|8421C541|APICALL:ShowWindow 8A  1
26  02|8421CC03|MSGCALL:0B3F0208   8A 18-WM_SHOWWINDOW 1 0
27  03|8421CF54|APICALL:DefWindowProc 8A 18-WM_SHOWWINDOW 1 0
28  03|8421D383|APIRET:DefWindowProc 0
29  02|8421D69B|MSGRET:0 0B3F0208   8A 18-WM_SHOWWINDOW 1 0
30  02|8421E196|MSGCALL:0B3F0208   8A 46-WM_WINDOWPOSCHANGING 0 C370180
31  03|8421E55E|APICALL:DefWindowProc 8A 46-WM_WINDOWPOSCHANGING 0 C370180
32  03|8421EABB|APIRET:DefWindowProc 0
33  02|8421EDE5|MSGRET:0 0B3F0208   8A 46-WM_WINDOWPOSCHANGING 0 C370180
34  02|8422093F|MSGCALL:0B3F0208   8A 30F-WM_QUERYNEWPALETTE 0 0
35  03|84220D55|APICALL:DefWindowProc 8A 30F-WM_QUERYNEWPALETTE 0 0
36  03|84221483|APIRET:DefWindowProc 0
37  02|842217AB|MSGRET:0 0B3F0208   8A 30F-WM_QUERYNEWPALETTE 0 0
38  02|84221F6C|MSGCALL:0B3F0208   8A 46-WM_WINDOWPOSCHANGING 0 C370180
39  03|84222313|APICALL:DefWindowProc 8A 46-WM_WINDOWPOSCHANGING 0 C370180
40  03|842227BC|APIRET:DefWindowProc 0
41  02|84222AD7|MSGRET:0 0B3F0208   8A 46-WM_WINDOWPOSCHANGING 0 C370180
42  02|84223361|MSGCALL:0B3F0208   8A 1C-WM_ACTIVATEAPP 1 0 0
43  03|8422370A|APICALL:DefWindowProc 8A 1C-WM_ACTIVATEAPP 1 0 0
44  03|84223AEF|APIRET:DefWindowProc 0
45  02|84223DF4|MSGRET:0 0B3F0208   8A 1C-WM_ACTIVATEAPP 1 0 0
46  02|84224454|MSGCALL:0B3F0208   8A 86-WM_NCACTIVATE 1 0
47  03|842247BA|APICALL:DefWindowProc 8A 86-WM_NCACTIVATE 1 0
48  04|8422576D|MSGCALL:0B3F0208   8A D-WM_GETTEXT 4F 0C370180
49  05|84225B46|APICALL:DefWindowProc 8A D-WM_GETTEXT 4F 0C370180
50  05|8422627D|APIRET:DefWindowProc 1A
51  04|842265B4|MSGRET:1A 0B3F0208   8A D-WM_GETTEXT 4F "Generic Sample Application"
52  03|84227DBE|APIRET:DefWindowProc 1
53  02|84228349|MSGRET:1 0B3F0208   8A 86-WM_NCACTIVATE 1 0
54  02|84228C98|MSGCALL:0B3F0208   8A 6-WM_ACTIVATE 1 0 0
55  03|84229017|APICALL:DefWindowProc 8A 6-WM_ACTIVATE 1 0 0
56  04|8422971B|MSGCALL:0B3F0208   8A 7-WM_SETFOCUS 0 0
57  05|84229A7B|APICALL:DefWindowProc 8A 7-WM_SETFOCUS 0 0
58  05|8422A23C|APIRET:DefWindowProc 0
59  04|8422A556|MSGRET:0 0B3F0208   8A 7-WM_SETFOCUS 0 0
60  03|8422C4D8|APIRET:DefWindowProc 0
61  02|8422C832|MSGRET:0 0B3F0208   8A 6-WM_ACTIVATE 1 0 0
62  02|8422D03E|MSGCALL:0B3F0208   8A 85-WM_NCPAINT E4 0
63  03|8422D3A8|APICALL:DefWindowProc 8A 85-WM_NCPAINT E4 0
64  04|8422F419|MSGCALL:0B3F0208   8A D-WM_GETTEXT 4F 0C370180
65  05|8422F7F0|APICALL:DefWindowProc 8A D-WM_GETTEXT 4F 0C370180
66  05|8422FCBB|APIRET:DefWindowProc 1A
67  04|8423063A|MSGRET:1A 0B3F0208   8A D-WM_GETTEXT 4F "Generic Sample Application"
68  03|84231791|APIRET:DefWindowProc 0
69  02|84231ADA|MSGRET:0 0B3F0208   8A 85-WM_NCPAINT E4 0
70  02|84232218|MSGCALL:0B3F0208   8A 14-WM_ERASEBKGND E4 0
71  03|84232599|APICALL:DefWindowProc 8A 14-WM_ERASEBKGND E4 0
72  03|842331A7|APIRET:DefWindowProc 1
73  02|842334E8|MSGRET:1 0B3F0208   8A 14-WM_ERASEBKGND E4 0
74  02|84233D1B|MSGCALL:0B3F0208   8A 47-WM_WINDOWPOSCHANGED 0 C370180
75  03|842340CC|APICALL:DefWindowProc 8A 47-WM_WINDOWPOSCHANGED 0 C370180
76  03|84234590|APIRET:DefWindowProc 0
77  02|84235D88|MSGRET:0 0B3F0208   8A 47-WM_WINDOWPOSCHANGED 0 C370180
78  02|8423651A|MSGCALL:0B3F0208   8A 5-WM_SIZE 0 1770278
79  03|84236865|APICALL:DefWindowProc 8A 5-WM_SIZE 0 1770278
80  03|84236C33|APIRET:DefWindowProc 0
```

```
 81  02:84236F3B|MSGRET:0 0B3F0208  8A 5-WM_SIZE 0 1770278
 82  02:8423746A|MSGCALL:0B3F0208  8A 3-WM_MOVE 0 2A0004
 83  03:84237796|APICALL:DefWindowProc 8A 3-WM_MOVE 0 2A0004
 84  03:84237B3E|APIRET:DefWindowProc 0
 85  02:84237E44|MSGRET:0 0B3F0208  8A 3-WM_MOVE 0 2A0004
 86  01:84238324|APIRET:ShowWindow FALSE
 87  01:8423860D|APICALL:UpdateWindow 8A
 88  02:84238CB5|MSGCALL:0B3F0208  8A F-WM_PAINT 0 0
 89  03:84238FEC|APICALL:BeginPaint 8A
 90  03:84239706|APIRET:BeginPaint E4  {E4 FALSE (0 0 278 177) FALSE FALSE 17 1 1F 8A
      8A 0 FF FF 14 0 0 0 95 5 9E 0 }
 91  03:8423A21C|APICALL:CreateSolidBrush 3030
 92  03:8423B05D|APIRET:CreateSolidBrush F0
 93  03:8423B3A5|APICALL:GrayString E4  F0  NULL <AQ       8 B1F0473 0 A A 0 0
 94  03:8423C2E3|APIRET:GrayString TRUE
 95  03:8423C643|APICALL:SetBkMode E4  1
 96  03:8423CDB3|APIRET:SetBkMode 2
 97  03:8423EE06|APICALL:SetTextColor E4  0
 98  03:8423F4B9|APIRET:SetTextColor 0
 99  03:8423FB39|APICALL:TextOut E4 95 95 "Testing 2"  9
100  03:84240065|APIRET:TextOut TRUE
101  03:84240349|APICALL:TextOut E4 96 95 "Testing 2"  9
102  03:84240AF0|APIRET:TextOut TRUE
103  03:84240DD4|APICALL:TextOut E4 97 95 "Testing 2"  9
104  03:84241288|APIRET:TextOut TRUE
105  03:8424155B|APICALL:TextOut E4 95 96 "Testing 2"  9
106  03:84241D70|APIRET:TextOut TRUE
107  03:84242060|APICALL:TextOut E4 97 96 "Testing 2"  9
108  03:84242525|APIRET:TextOut TRUE
109  03:842427FB|APICALL:TextOut E4 95 97 "Testing 2"  9
110  03:84242CAC|APIRET:TextOut TRUE
111  03:84242F81|APICALL:TextOut E4 96 97 "Testing 2"  9
112  03:84249230|APIRET:TextOut TRUE
113  03:84249571|APICALL:TextOut E4 97 97 "Testing 2"  9
114  03:84249A96|APIRET:TextOut TRUE
115  03:84249D6E|APICALL:SetTextColor E4  FFFFFF
116  03:8424A1E6|APIRET:SetTextColor 0
117  03:8424A57D|APICALL:TextOut E4 96 96 "Testing 2"  9
118  03:8424AA39|APIRET:TextOut TRUE
119  03:8424AD19|APICALL:EndPaint 8A  {E4 FALSE (0 0 278 177) FALSE FALSE 17 1 1F 8A 8A
      0 FF FF 14 0 0 0 95 5 9E 0 }
120  03:8424C06A|APIRET:EndPaint
121  02:8424C2FC|MSGRET:0 0B3F0208  8A F-WM_PAINT 0 0
122  01:8424C833|APIRET:UpdateWindow
123  01:8424CADB|APICALL:GetMessage 0 0 0
124  02:8424D2A6|MSGCALL:0B3F0208  8A 84-WM_NCHITTEST 0 8700E7
125  03:8424D63E|APICALL:DefWindowProc 8A 84-WM_NCHITTEST 0 8700E7
126  03:8424DAF7|APIRET:DefWindowProc 1
127  02:8424DE21|MSGRET:1 0B3F0208  8A 84-WM_NCHITTEST 0 8700E7
128  02:8424E7E6|MSGCALL:0B3F0208  8A 20-WM_SETCURSOR 8A 2000001
129  03:8424EC7D|APICALL:DefWindowProc 8A 20-WM_SETCURSOR 8A 2000001
130  03:8424F7E9|APIRET:DefWindowProc 0
131  02:8424FB29|MSGRET:0 0B3F0208  8A 20-WM_SETCURSOR 8A 2000001
132  01:842501D6|APIRET:GetMessage TRUE {8A 200 0 5D00E3 001C5B1F {E7 87} }
133  01:8425080F|APICALL:TranslateMessage {8A 200 0 5D00E3 001C5B1F {E7 87} }
134  01:84250D97|APIRET:TranslateMessage FALSE
```

```
135  01|8425107A|APICALL:DispatchMessage {8A 200 0 5D00E3 001C5B1F {E7 87} }
136  02|842516AE|MSGCALL:0B3F0208  8A 200-WM_MOUSEMOVE/WM_MOUSEFIRST 0 5D00E3
137  03|84251A8B|APICALL:DefWindowProc 8A 200-WM_MOUSEMOVE/WM_MOUSEFIRST 0 5D00E3
138  03|84251EC6|APIRET:DefWindowProc 0
139  02|842521D0|MSGRET:0 0B3F0208  8A 200-WM_MOUSEMOVE/WM_MOUSEFIRST 0 5D00E3
140  01|842525BD|APIRET:DispatchMessage 0
141  01|842528B0|APICALL:GetMessage 0  0  0
142  02|8431B873|MSGCALL:0B3F0208  8A 84-WM_NCHITTEST 0 8700E6
143  03|8431C5C6|APICALL:DefWindowProc 8A 84-WM_NCHITTEST 0 8700E6
144  03|8431CB83|APIRET:DefWindowProc 1
145  02|8431CEC0|MSGRET:1 0B3F0208  8A 84-WM_NCHITTEST 0 8700E6
146  02|8431D5B9|MSGCALL:0B3F0208  8A 20-WM_SETCURSOR 8A 2000001
147  03|8431D959|APICALL:DefWindowProc 8A 20-WM_SETCURSOR 8A 2000001
148  03|8431DFA7|APIRET:DefWindowProc 0
149  02|8431E2D3|MSGRET:0 0B3F0208  8A 20-WM_SETCURSOR 8A 2000001
150  01|8431E982|APIRET:GetMessage TRUE {8A 200 0 5D00E2 001C5DE0 {E6 87} }
151  01|8431EDB4|APICALL:TranslateMessage {8A 200 0 5D00E2 001C5DE0 {E6 87} }
152  01|8431FC2D|APIRET:TranslateMessage FALSE
153  01|8431FF1E|APICALL:DispatchMessage {8A 200 0 5D00E2 001C5DE0 {E6 87} }
154  02|843205FB|MSGCALL:0B3F0208  8A 200-WM_MOUSEMOVE/WM_MOUSEFIRST 0 5D00E2
155  03|843209DF|APICALL:DefWindowProc 8A 200-WM_MOUSEMOVE/WM_MOUSEFIRST 0 5D00E2
156  03|84320E18|APIRET:DefWindowProc 0
157  02|84321129|MSGRET:0 0B3F0208  8A 200-WM_MOUSEMOVE/WM_MOUSEFIRST 0 5D00E2
158  01|843219D0|APIRET:DispatchMessage 0
159  01|84321CFD|APICALL:GetMessage 0  0  0
160  02|84322475|MSGCALL:0B3F0208  8A 84-WM_NCHITTEST 0 8700E5
161  03|84322814|APICALL:DefWindowProc 8A 84-WM_NCHITTEST 0 8700E5
162  03|84322C9F|APIRET:DefWindowProc 1
163  02|843232FE|MSGRET:1 0B3F0208  8A 84-WM_NCHITTEST 0 8700E5
164  02|84323C28|MSGCALL:0B3F0208  8A 20-WM_SETCURSOR 8A 2000001
165  03|8432402D|APICALL:DefWindowProc 8A 20-WM_SETCURSOR 8A 2000001
166  03|84324658|APIRET:DefWindowProc 0
167  02|84324984|MSGRET:0 0B3F0208  8A 20-WM_SETCURSOR 8A 2000001
168  01|843250D1|APIRET:GetMessage TRUE {8A 200 0 5D00E1 001C5DFE {E5 87} }   ????
169  01|84325808|APICALL:TranslateMessage {8A 200 0 5D00E1 001C5DFE {E5 87} }
170  01|84325D8A|APIRET:TranslateMessage FALSE
171  01|8432606C|APICALL:DispatchMessage {8A 200 0 5D00E1 001C5DFE {E5 87} }
172  02 84326F02|MSGCALL:0B3F0208  8A 200-WM_MOUSEMOVE/WM_MOUSEFIRST 0 5D00E1
173  03 843272ED|APICALL:DefWindowProc 8A 200-WM_MOUSEMOVE/WM_MOUSEFIRST 0 5D00E1
174  03 8432772D|APIRET:DefWindowProc 0
175  02 84327A3D|MSGRET:0 0B3F0208  8A 200-WM_MOUSEMOVE/WM_MOUSEFIRST 0 5D00E1
176  01|84327E32|APIRET:DispatchMessage 0
177  01|8442369A|APICALL:GetMessage 0  0  0
178  01|8456DF3E|APIRET:GetMessage TRUE {8A 100 10 360001 001C65D8 {12E 7F} }
179  01|8456E4D9|APICALL:TranslateMessage {8A 100 10 360001 001C65D8 {12E 7F} }
180  01|8456ED61|APIRET:TranslateMessage TRUE
181  01|8456F0A2|APICALL:DispatchMessage {8A 100 10 360001 001C65D8 {12E 7F} }
182  02|8456FA00|MSGCALL:0B3F0208  8A 100-WM_KEYDOWN/WM_KEYFIRST 10 360001
183  03|8456FECA|APICALL:DefWindowProc 8A 100-WM_KEYDOWN/WM_KEYFIRST 10 360001
184  03|8457041C|APIRET:DefWindowProc 0
185  02|8457077A|MSGRET:0 0B3F0208  8A 100-WM_KEYDOWN/WM_KEYFIRST 10 360001
186  01|84570BD3|APIRET:DispatchMessage 0
187  01|84570F03|APICALL:GetMessage 0  0  0
188  01|8459F38C|APIRET:GetMessage TRUE {8A 100 48 230001 001C668C {12E 7F} }
189  01|8459F850|APICALL:TranslateMessage {8A 100 48 230001 001C668C {12E 7F} }
190  01|845A013A|APIRET:TranslateMessage TRUE
```

```
191  01|845A0475|APICALL:DispatchMessage {8A 100 48 230001 001C668C {12E 7F} }
192  02|845A0B38|MSGCALL:0B3F0208   8A 100-WM_KEYDOWN/WM_KEYFIRST 48 230001
193  03|845A0F7B|APICALL:DefWindowProc 8A 100-WM_KEYDOWN/WM_KEYFIRST 48 230001
194  03|845A17C5|APIRET:DefWindowProc 0
195  02|845A1B50|MSGRET:0 0B3F0208   8A 100-WM_KEYDOWN/WM_KEYFIRST 48 230001
196  01|845A1FBD|APIRET:DispatchMessage 0
197  01|845A22EC APICALL:GetMessage 0 0 0
198  01|845A342A|APIRET:GetMessage TRUE {8A 102 48 230001 001C668C {12E 7F} }
199  01|845A38D6|APICALL:TranslateMessage {8A 102 48 230001 001C668C {12E 7F} }
200  01|845A3ED0|APIRET:TranslateMessage FALSE
201  01|845A41F1|APICALL:DispatchMessage {8A 102 48 230001 001C668C {12E 7F} }
202  02|845A48A3|MSGCALL:0B3F0208   8A 102-WM_CHAR 48 230001
203  03|845A4C8F|APICALL:DefWindowProc 8A 102-WM_CHAR 48 230001
204  03|845A50D2|APIRET:DefWindowProc 0
205  02|845A541A MSGRET:0 0B3F0208   8A 102-WM_CHAR 48 230001
206  01|845A580D|APIRET:DispatchMessage 0
207  01|845A5B39|APICALL:GetMessage 0 0 0
208  01|845BACF6|APIRET:GetMessage TRUE {8A 101 48 C0230001 001C66E6 {12E 7F} }
209  01|845BB1D4|APICALL:TranslateMessage {8A 101 48 C0230001 001C66E6 {12E 7F} }
210  01|845BB9D9|APIRET:TranslateMessage TRUE
211  01|845BBD14|APICALL:DispatchMessage {8A 101 48 C0230001 001C66E6 {12E 7F} }
212  02|845BC3F3|MSGCALL:0B3F0208   8A 101-WM_KEYUP 48 C0230001
213  03|845BC8C4|APICALL:DefWindowProc 8A 101-WM_KEYUP 48 C0230001
214  03|845BCFA8|APIRET:DefWindowProc 0
215  02|845BD325|MSGRET:0 0B3F0208   8A 101-WM_KEYUP 48 C0230001
216  01|845BD746|APIRET:DispatchMessage 0
217  01|845BDA7A|APICALL:GetMessage 0 0 0
218  01|845D0A5E|APIRET:GetMessage TRUE {8A 101 10 C0360001 001C6731 {12E 7F} }
219  01|845D0EC5|APICALL:TranslateMessage {8A 101 10 C0360001 001C6731 {12E 7F} }
220  01|845D1B8B|APIRET:TranslateMessage TRUE
221  01|845D1E8C|APICALL:DispatchMessage {8A 101 10 C0360001 001C6731 {12E 7F} }
222  02|845D24F5|MSGCALL:0B3F0208   8A 101-WM_KEYUP 10 C0360001
223  03|845D28AD|APICALL:DefWindowProc 8A 101-WM_KEYUP 10 C0360001
224  03|845D3308|APIRET:DefWindowProc 0
225  02|845D3646|MSGRET:0 0B3F0208   8A 101-WM_KEYUP 10 C0360001
226  01|845D3A0E|APIRET:DispatchMessage 0
227  01|845D3D04|APICALL:GetMessage 0 0 0
228  01|845F5E5A|APIRET:GetMessage TRUE {8A 100 45 120001 001C67A9 {12E 7F} }
229  01|845F62AF|APICALL:TranslateMessage {8A 100 45 120001 001C67A9 {12E 7F} }
230  01|845F6B38|APIRET:TranslateMessage TRUE
231  01|845F6E2E|APICALL:DispatchMessage {8A 100 45 120001 001C67A9 {12E 7F} }
232  02|845F748B|MSGCALL:0B3F0208   8A 100-WM_KEYDOWN/WM_KEYFIRST 45 120001
233  03|845F7873 APICALL:DefWindowProc 8A 100-WM_KEYDOWN/WM_KEYFIRST 45 120001
234  03|845F7D43|APIRET:DefWindowProc 0
235  02|845F8061|MSGRET:0 0B3F0208   8A 100-WM_KEYDOWN/WM_KEYFIRST 45 120001
236  01|845F8446|APIRET:DispatchMessage 0
237  01|845F8738|APICALL:GetMessage 0 0 0
238  01|845F8D36|APIRET:GetMessage TRUE {8A 102 65 120001 001C67B8 {12E 7F} }
239  01|845F913A|APICALL:TranslateMessage {8A 102 65 120001 001C67B8 {12E 7F} }
240  01|845F96B0|APIRET:TranslateMessage FALSE
241  01|845F9990|APICALL:DispatchMessage {8A 102 65 120001 001C67B8 {12E 7F} }
242  02|845FB0AF|MSGCALL:0B3F0208   8A 102-WM_CHAR 65 120001
243  03|845FB47D|APICALL:DefWindowProc 8A 102-WM_CHAR 65 120001
244  03|845FB86B|APIRET:DefWindowProc 0
245  02|845FBB8C|MSGRET:0 0B3F0208   8A 102-WM_CHAR 65 120001
246  01|845FBF2F|APIRET:DispatchMessage 0
```

```
247  01|845FC21C|APICALL:GetMessage 0  0  0
248  01|8460E531|APIRET:GetMessage TRUE {8A 101 45 C0120001 001C6803 {12E 7F} }
249  01|8460E999|APICALL:TranslateMessage {8A 101 45 C0120001 001C6803 {12E 7F} }
250  01|8460F436|APIRET:TranslateMessage TRUE
251  01|8460F737|APICALL:DispatchMessage {8A 101 45 C0120001 001C6803 {12E 7F} }
252  02|8460FE34|MSGCALL:0B3F0208  8A 101-WM_KEYUP 45 C0120001
253  03|846101EE|APICALL:DefWindowProc 8A 101-WM_KEYUP 45 C0120001
254  03|84610841|APIRET:DefWindowProc 0
255  02|846103B7D|MSGRET:0 0B3F0208  8A 101-WM_KEYUP 45 C0120001
256  01|84610F3C|APIRET:DispatchMessage 0
257  01|84611231|APICALL:GetMessage 0  0  0
258  01|846513B3|APIRET:GetMessage TRUE {8A 100 4C 260001 001C68E4 {12E 7F} }
259  01|846518DC|APICALL:TranslateMessage {8A 100 4C 260001 001C68E4 {12E 7F} }
260  01|84652174|APIRET:TranslateMessage TRUE
261  01|8465246A|APICALL:DispatchMessage {8A 100 4C 260001 001C68E4 {12E 7F} }
262  02|84652AD1|MSGCALL:0B3F0208  8A 100-WM_KEYDOWN/WM_KEYFIRST 4C 260001
263  03|84652EB9|APICALL:DefWindowProc 8A 100-WM_KEYDOWN/WM_KEYFIRST 4C 260001
264  03|8465338D|APIRET:DefWindowProc 0
265  02|846536A9|MSGRET:0 0B3F0208  8A 100-WM_KEYDOWN/WM_KEYFIRST 4C 260001
266  01|84653A91|APIRET:DispatchMessage 0
267  01|84653D82|APICALL:GetMessage 0  0  0
268  01|84654393|APIRET:GetMessage TRUE {8A 102 6C 260001 001C68F3 {12E 7F} }
269  01|84654796|APICALL:TranslateMessage {8A 102 6C 260001 001C68F3 {12E 7F} }
270  01|84654D0C|APIRET:TranslateMessage FALSE
271  01|84654EEC|APICALL:DispatchMessage {8A 102 6C 260001 001C68F3 {12E 7F} }
272  02|84655604|MSGCALL:0B3F0208  8A 102-WM_CHAR 6C 260001
273  03|84655978|APICALL:DefWindowProc 8A 102-WM_CHAR 6C 260001
274  03|846570A4|APIRET:DefWindowProc 0
275  02|846573D4|MSGRET:0 0B3F0208  8A 102-WM_CHAR 6C 260001
276  01|8465778A|APIRET:DispatchMessage 0
277  01|84657A7D|APICALL:GetMessage 0  0  0
278  01|84661F68|APIRET:GetMessage TRUE {8A 101 4C C0260001 001C6920 {12E 7F} }
279  01|846623B6|APICALL:TranslateMessage {8A 101 4C C0260001 001C6920 {12E 7F} }
280  01|84662B62|APIRET:TranslateMessage TRUE
281  01|84663E6E|APICALL:DispatchMessage {8A 101 4C C0260001 001C6920 {12E 7F} }
282  02|84664780|MSGCALL:0B3F0208  8A 101-WM_KEYUP 4C C0260001
283  03|84664B3E|APICALL:DefWindowProc 8A 101-WM_KEYUP 4C C0260001
284  03|846651D1|APIRET:DefWindowProc 0
285  02|84665509|MSGRET:0 0B3F0208  8A 101-WM_KEYUP 4C C0260001
286  01|846658C7|APIRET:DispatchMessage 0
287  01|84665BBD|APICALL:GetMessage 0  0  0
288  01|84678FD0|APIRET:GetMessage TRUE {8A 100 4C 260001 001C696B {12E 7F} }
289  01|84679422|APICALL:TranslateMessage {8A 100 4C 260001 001C696B {12E 7F} }
290  01|84679F3D|APIRET:TranslateMessage TRUE
291  01|8467A23F|APICALL:DispatchMessage {8A 100 4C 260001 001C696B {12E 7F} }
292  02|8467A8AE|MSGCALL:0B3F0208  8A 100-WM_KEYDOWN/WM_KEYFIRST 4C 260001
293  03|8467AC99|APICALL:DefWindowProc 8A 100-WM_KEYDOWN/WM_KEYFIRST 4C 260001
294  03|8467B163|APIRET:DefWindowProc 0
295  02|8467B483|MSGRET:0 0B3F0208  8A 100-WM_KEYDOWN/WM_KEYFIRST 4C 260001
296  01|8467B868|APIRET:DispatchMessage 0
297  01|8467BB57|APICALL:GetMessage 0  0  0
298  01|8467C16F|APIRET:GetMessage TRUE {8A 102 6C 260001 001C697A {12E 7F} }
299  01|8467C573|APICALL:TranslateMessage {8A 102 6C 260001 001C697A {12E 7F} }
300  01|8467CAEC|APIRET:TranslateMessage FALSE
301  01|8467CDCB|APICALL:DispatchMessage {8A 102 6C 260001 001C697A {12E 7F} }
302  02|8467E95C|MSGCALL:0B3F0208  8A 102-WM_CHAR 6C 260001
```

```
303  03|8467ED04|APICALL:DefWindowProc 8A 102-WM_CHAR 6C 260001
304  03|8467F0F3|APIRET:DefWindowProc 0
305  02|8467F403|MSGRET:0 0B3F0208  8A 102-WM_CHAR 6C 260001
306  01|8467F79F|APIRET:DispatchMessage 0
307  01|8467FA8C|APICALL:GetMessage 0 0 0
308  01|8468BE51|APIRET:GetMessage TRUE {8A 101 4C C0260001 001C69B6 {12E 7F} }
309  01|8468C29D|APICALL:TranslateMessage {8A 101 4C C0260001 001C69B6 {12E 7F} }
310  01|8468CA52|APIRET:TranslateMessage TRUE
311  01|8468CD49|APICALL:DispatchMessage {8A 101 4C C0260001 001C69B6 {12E 7F} }
312  02|8468D6E5|MSGCALL:0B3F0208  8A 101-WM_KEYUP 4C C0260001
313  03|8468DA89|APICALL:DefWindowProc 8A 101-WM_KEYUP 4C C0260001
314  03|8468E10C|APIRET:DefWindowProc 0
315  02|8468E443|MSGRET:0 0B3F0208  8A 101-WM_KEYUP 4C C0260001
316  01|8468E8AC|APIRET:DispatchMessage 0
317  01|8468EBA6|APICALL:GetMessage 0 0 0
318  01|846A798F|APIRET:GetMessage TRUE {8A 100 4F 180001 001C6A10 {12E 7F} }
319  01|846A7DC9|APICALL:TranslateMessage {8A 100 4F 180001 001C6A10 {12E 7F} }
320  01|846A863C|APIRET:TranslateMessage TRUE
321  01|846A8932|APICALL:DispatchMessage {8A 100 4F 180001 001C6A10 {12E 7F} }
322  02|846A906E|MSGCALL:0B3F0208  8A 100-WM_KEYDOWN/WM_KEYFIRST 4F 180001
323  03|846A943B|APICALL:DefWindowProc 8A 100-WM_KEYDOWN/WM_KEYFIRST 4F 180001
324  03|846A98F6|APIRET:DefWindowProc 0
325  02|846A9C12|MSGRET:0 0B3F0208  8A 100-WM_KEYDOWN/WM_KEYFIRST 4F 180001
326  01|846A9FF2|APIRET:DispatchMessage 0
327  01|846AA2E2|APICALL:GetMessage 0 0 0
328  01|846AACAB|APIRET:GetMessage TRUE {8A 102 6F 180001 001C6A10 {12E 7F} }
329  01|846AB0C5|APICALL:TranslateMessage {8A 102 6F 180001 001C6A10 {12E 7F} }
330  01|846AB63F|APIRET:TranslateMessage FALSE
331  01|846AB91D|APICALL:DispatchMessage {8A 102 6F 180001 001C6A10 {12E 7F} }
332  02|846ABF48|MSGCALL:0B3F0208  8A 102-WM_CHAR 6F 180001
333  03|846AC642|APICALL:DefWindowProc 8A 102-WM_CHAR 6F 180001
334  03|846ACA31|APIRET:DefWindowProc 0
335  02|846ACD3C|MSGRET:0 0B3F0208  8A 102-WM_CHAR 6F 180001
336  01|846AD16D|APIRET:DispatchMessage 0
337  01|846AD460|APICALL:GetMessage 0 0 0
338  01|846BBE04|APIRET:GetMessage TRUE {8A 101 4F C0180001 001C6A5B {12E 7F} }
339  01|846BC24E|APICALL:TranslateMessage {8A 101 4F C0180001 001C6A5B {12E 7F} }
340  01|846BC9C1|APIRET:TranslateMessage TRUE
341  01|846BCCB6|APICALL:DispatchMessage {8A 101 4F C0180001 001C6A5B {12E 7F} }
342  02|846BD2FC|MSGCALL:0B3F0208  8A 101-WM_KEYUP 4F C0180001
343  03|846BD69E|APICALL:DefWindowProc 8A 101-WM_KEYUP 4F C0180001
344  03|846BDCC5|APIRET:DefWindowProc 0
345  02|846BDFFD|MSGRET:0 0B3F0208  8A 101-WM_KEYUP 4F C0180001
346  01|846BE3B6|APIRET:DispatchMessage 0
347  01|846BE6AD|APICALL:GetMessage 0 0 0
348  01|8485206D|APIRET:GetMessage TRUE {8A 104 12 20380001 001C6FCE {12E 7F} }
349  01|848524E0|APICALL:TranslateMessage {8A 104 12 20380001 001C6FCE {12E 7F} }
350  01|84852CEB|APIRET:TranslateMessage TRUE
351  01|84852FE3|APICALL:DispatchMessage {8A 104 12 20380001 001C6FCE {12E 7F} }
352  02|8485365B|MSGCALL:0B3F0208  8A 104-WM_SYSKEYDOWN 12 20380001
353  03|84853A2E|APICALL:DefWindowProc 8A 104-WM_SYSKEYDOWN 12 20380001
354  03|848540BD|APIRET:DefWindowProc 0
355  02|848543FC|MSGRET:0 0B3F0208  8A 104-WM_SYSKEYDOWN 12 20380001
356  01|848547D6|APIRET:DispatchMessage 0
357  01|84854ACB|APICALL:GetMessage 0 0 0
358  01|848B8CC5|APIRET:GetMessage TRUE {8A 104 73 203E0001 001C7127 {12E 7F} }
```

```
359  01|848B912B|APICALL:TranslateMessage {8A 104 73 203E0001 001C7127 {12E 7F} }
360  01|848B9C91|APIRET:TranslateMessage TRUE
361  01|848BA22F|APICALL:DispatchMessage {8A 104 73 203E0001 001C7127 {12E 7F} }
362  02|848BA907|MSGCALL:0B3F0208   8A 104-WM_SYSKEYDOWN 73 203E0001
363  03|848BAFBF|APICALL:DefWindowProc 8A 104-WM_SYSKEYDOWN 73 203E0001
364  03|848BB930|APIRET:DefWindowProc 0
365  02|848BBC6C|MSGRET:0 0B3F0208   8A 104-WM_SYSKEYDOWN 73 203E0001
366  01|848BC065|APIRET:DispatchMessage 0
367  01|848BC35B|APICALL:GetMessage 0 0 0
368  01|848BC944|APIRET:GetMessage TRUE {8A 112 F060 0 001C7136 {12E 7F} }
369  01|848BCD49|APICALL:TranslateMessage {8A 112 F060 0 001C7136 {12E 7F} }
370  01|848BD2B2|APIRET:TranslateMessage FALSE
371  01|848BD591|APICALL:DispatchMessage {8A 112 F060 0 001C7136 {12E 7F} }
372  02|848BEEC4|MSGCALL:0B3F0208   8A 112-WM_SYSCOMMAND F060 0
373  03|848BF574|APICALL:DefWindowProc 8A 112-WM_SYSCOMMAND F060 0
374  04|848BFD1F|MSGCALL:0B3F0208   8A 10-WM_CLOSE 0 0
375  05|848C0065|APICALL:DefWindowProc 8A 10-WM_CLOSE 0 0
376  06|848C086B|MSGCALL:0B3F0208   8A 46-WM_WINDOWPOSCHANGING 0 C370180
377  07|848C0C20|APICALL:DefWindowProc 8A 46-WM_WINDOWPOSCHANGING 0 C370180
378  07|848C10DF|APIRET:DefWindowProc 0
379  06|848C140E|MSGRET:0 0B3F0208   8A 46-WM_WINDOWPOSCHANGING 0 C370180
380  06|848C2EEB|MSGCALL:0B3F0208   8A 47-WM_WINDOWPOSCHANGED 0 C370180
381  07|848C32DC|APICALL:DefWindowProc 8A 47-WM_WINDOWPOSCHANGED 0 C370180
382  07|848C37A1|APIRET:DefWindowProc 0
383  06|848C3E3B|MSGRET:0 0B3F0208   8A 47-WM_WINDOWPOSCHANGED 0 C370180
384  06|848D755E|MSGCALL:0B3F0208   8A 86-WM_NCACTIVATE 0 0
385  07|848D7961|APICALL:DefWindowProc 8A 86-WM_NCACTIVATE 0 0
386  07|848D80E3|APIRET:DefWindowProc 1
387  06|848D841D|MSGRET:1 0B3F0208   8A 86-WM_NCACTIVATE 0 0
388  06|848D89AC|MSGCALL:0B3F0208   8A 6-WM_ACTIVATE 0 0 0
389  07|848D8D13|APICALL:DefWindowProc 8A 6-WM_ACTIVATE 0 0 0
390  07|848D9162|APIRET:DefWindowProc 0
391  06|848D947B|MSGRET:0 0B3F0208   8A 6-WM_ACTIVATE 0 0 0
392  06|848D9AC8|MSGCALL:0B3F0208   8A 1C-WM_ACTIVATEAPP 0 0 0
393  07|848D9E54|APICALL:DefWindowProc 8A 1C-WM_ACTIVATEAPP 0 0 0
394  07|848DA22F|APIRET:DefWindowProc 0
395  06|848DA533|MSGRET:0 0B3F0208   8A 1C-WM_ACTIVATEAPP 0 0 0
396  06|848DAB85|MSGCALL:0B3F0208   8A 8-WM_KILLFOCUS 0 0
397  07|848DAECE|APICALL:DefWindowProc 8A 8-WM_KILLFOCUS 0 0
398  07|848DB26F|APIRET:DefWindowProc 0
399  06|848DB576|MSGRET:0 0B3F0208   8A 8-WM_KILLFOCUS 0 0
400  06|848DBB1E|MSGCALL:0B3F0208   8A 2-WM_DESTROY 0 0
401  07|848DBE46|APICALL:PostQuitMessage 0
402  07|848DD880|APIRET:PostQuitMessage
403  06|848DDDBB|MSGRET:0 0B3F0208   8A 2-WM_DESTROY 0 0
404  06|848DE802|MSGCALL:0B3F0208   8A 82-WM_NCDESTROY 0 0
405  07|848DEB6D|APICALL:DefWindowProc 8A 82-WM_NCDESTROY 0 0
406  07|848DF626|APIRET:DefWindowProc 0
407  06|848E0EE2|MSGRET:0 0B3F0208   8A 82-WM_NCDESTROY 0 0
408  05|848E4690|APIRET:DefWindowProc 0
409  04|848E49E8|MSGRET:0 0B3F0208   8A 10-WM_CLOSE 0 0
410  03|848E5237|APIRET:DefWindowProc 0
411  02|848E5582|MSGRET:0 0B3F0208   8A 112-WM_SYSCOMMAND F060 0
412  01|848E596B|APIRET:DispatchMessage 0
413  01|848E5C61|APICALL:GetMessage 0 0 0
414  01|848E621C|APIRET:GetMessage FALSE {0 12 0 0 001C71CC {12E 7F} }
```

The Synthetic GUI Application

Once a log file for the execution of an application program is generated, the execution of the application program can be simulated on a new operating system. The synthetic GUI application (SGA) program reads in the log file and simulates the recorded behavior by invoking the functions of the new operating system or some other existing operating system. By simulating the behavior of the application program, the new operating system can be tested to ensure its functions perform correctly.

The SGA program provides a thunk function for every real function of the old operating system. The thunk function simulates the execution of the real function on the new operating system by invoking the functions of the new operating system. If the new operating system has a function whose behavior corresponds to the behavior of the function of the old operating system, then the thunk function can use the function of the new operating system to simulate the behavior. However, if there is no corresponding function of the new operating system, then the thunk function may have to invoke several functions of the new operating system to simulate the behavior.

Each thunk function that corresponds to a real function, that is passed a callback routine, provides a thunk callback routine. The thunk callback routine simulates the behavior of the corresponding real callback routine in the application program. Each thunk callback routine, when invoked by the new operating system, invokes an SGAEngine routine, as described below, to simulate the behavior of the application program.

Figure 10A:
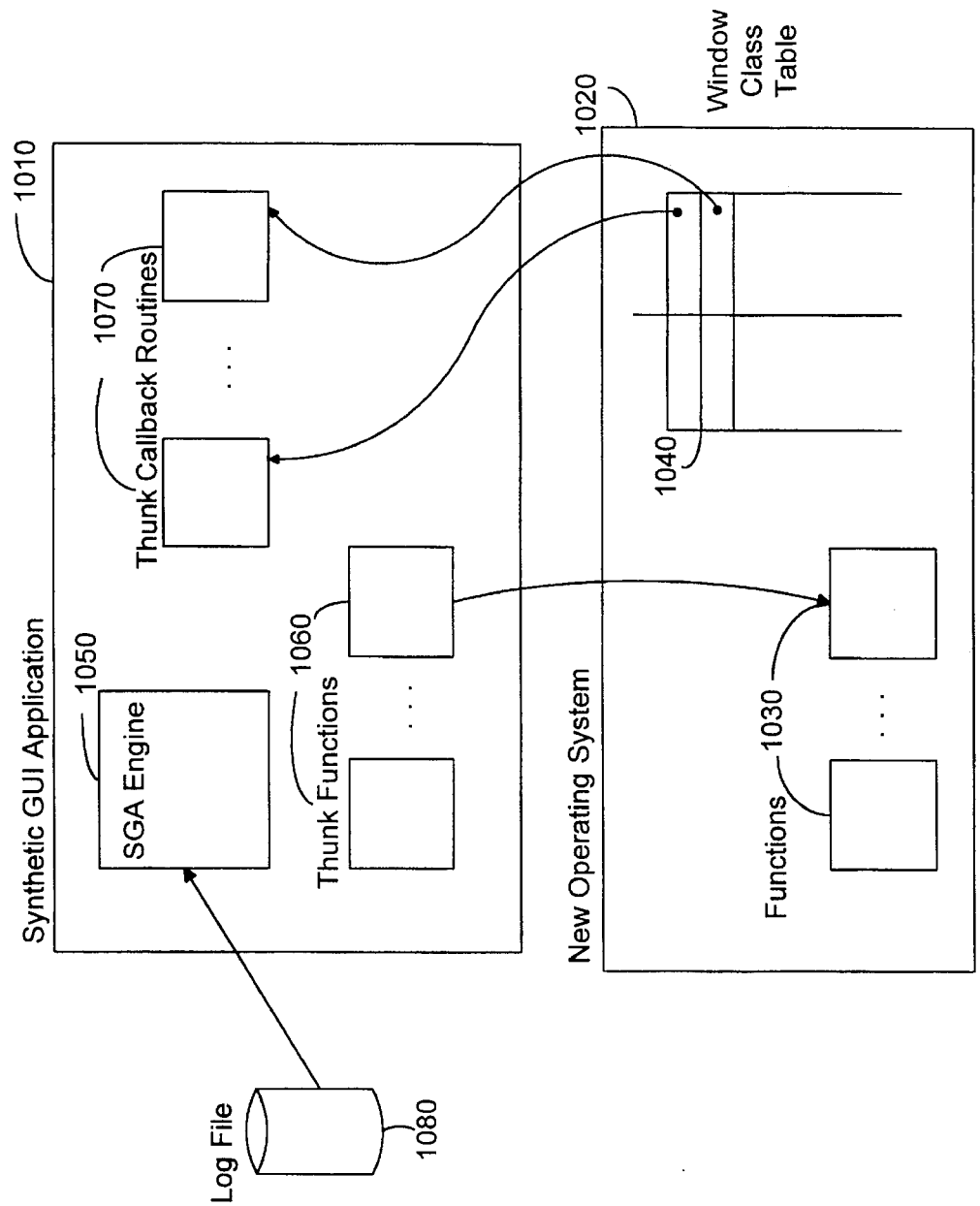
FIG. 10A is an overview diagram illustrating the synthetic GUI application.

FIG. 10A is an overview diagram illustrating the synthetic GUI application (SGA). The SGA 1010 comprises the SGAEngine routine 1050, thunk functions 1060 for each real function of the old operating system, and thunk callback routines 1070 corresponding to real callback routines of the new operating system. The new operating system 1020 comprises real functions 1030 and a window class table 1014. The SGA 1010 reads the log file and simulates the execution of the recorded application program. Each recorded invocation of a function is simulated by invoking the corresponding thunk function with the recorded passed parameter(s). The behavior of each invocation of a callback routine is simulated by a thunk callback routine.

The SGAEngine routine 1050 controls the simulation. The routine is passed a message and simulates the execution of that message. The routine scans the log file for the invocation of a callback routine through which the message is sent to the application. The routine then simulates the execution of each invocation of a function that is nested within that callback routine. For example, if the SGAEngine routine is invoked for the message WM_CREATE corresponding to line 20, then the routine simulates the nested invocation of the function DefWindowProc at line 21. The SGAEngine routine retrieves the passed parameters from the log file and invokes functions of the new operating system to simulate the behavior of the function of the old operating system. When the function of the new operating system is complete, the SGAEngine routine determines whether the returned parameters compare to the logged returned parameter. If the parameters do not compare, then the difference is noted. Optionally, timing information about the invocation on the new operating system can be recorded in a separate new log file.

Figure 10B:
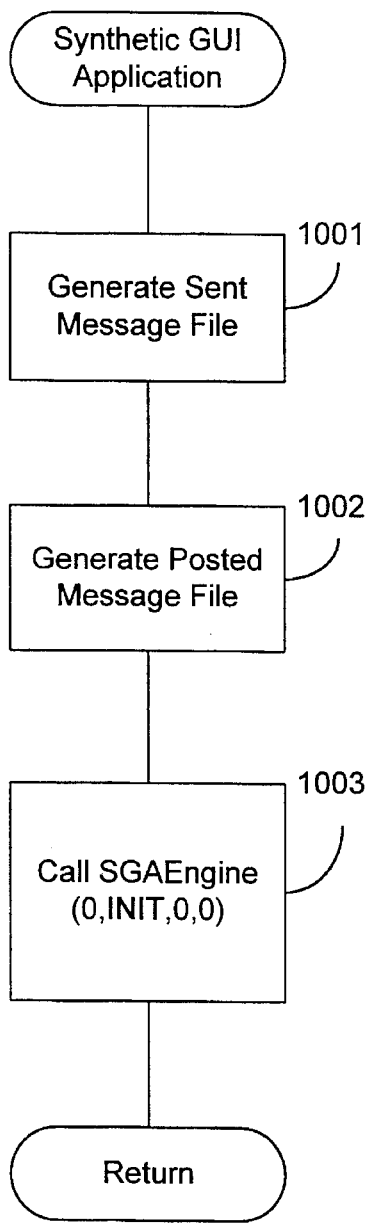
FIG. 10B is a flow diagram of the synthetic GUI application program.

FIG. 10B is a flow diagram of the synthetic GUI application program. The synthetic GUI application (SGA) inputs a log file and simulates the execution of the GUI application program recorded in the log file by invoking functions of a new operating system. In step 1001, the SGA generates a sent message file (SMF). The sent message file contains an entry for each sent message recorded in the log file. Each entry in the sent message file contains an identifier of the message, the line number of the message in the log file, and a handle identifying the resource (e.g., window, dialog box) to which the message is directed. Table 3 is a sample sent message file generated for the log file of Table 2. Line number 5 of the sent message file contains the entry "WM_CREATE 20, 8A", which indicates that line number 20 of the log file records that a WM_CREATE was sent to the window with handle 8A. In step 1002, the SGA generates a posted message file (PMF). The posted message file contains an entry for each posted message recorded in the log file. Each entry in the posted message file contains the message name, the line number corresponding to the retrieval of the message, the line number where the event corresponding to the posted message should be simulated, and a handle identifying the resource (e.g., window, dialog box) to which the message is directed. Table 4 contains a sample posted message file for the log file of Table 2. Line number 5 in the posted message file contains the entry "WM_KEYDOWN 192, 187, 8A", which indicates that line number 192 in the log file records at a WM_KEYDOWN message was retrieved by the window procedure for the window with handle 8A and that the posting of the message should be simulated at line 187. Alternatively, a sent message file and a posted message file is generated by the logger during the execution of the application program. In step 1003, the SGA invokes a SGAEngine routine to simulate execution of the application program.

TABLE 3

| SENT MESSAGE FILE | | |
|---|---|---|
| 1 | INIT | 0,8A |
| 2 | WM_GETMINMAXINFO | 8,8A |
| 3 | WM_NCCREATE | 12,8A |
| 4 | WM_NCCALCSIZE | 16,8A |
| 5 | WM_CREATE | 20,8A |
| 6 | WM_SHOWWINDOW | 26,8A |
| 7 | WM_WINDOWPOSCHANGING | 30,8A |
| 8 | WM_QUERYNEWPALETTE | 34,8A |
| 9 | WM_WINDOWPOSCHANGING | 38,8A |
| 10 | WM_ACTIVATEAPP | 40,8A |
| 11 | WM_NCACTIVATE | 46,8A |
| 12 | WM_GETTEXT | 48,8A |
| 13 | WM_ACTIVATE | 54,8A |
| 14 | WM_SETFOCUS | 56,8A |
| 15 | WM_NCPAINT | 67,8A |
| 16 | WM_GETTEXT | 64,8A |
| 17 | WM_ERASEBKGND | 70,8A |
| 18 | WM_WINDOWPOSCHANGED | 74,8A |
| 19 | WM_SIZE | 78,8A |
| 20 | WM_MOVE | 82,8A |
| 21 | WM_PAINT | 88,8A |
| 22 | WM_NCHITTEST | 126,8A |
| 23 | WM_SETCURSOR | 130,8A |
| 24 | WM_MOUSEMOVE | 138,8A |
| 25 | WM_NCHITTEST | 144,8A |
| 26 | WM_SETCURSOR | 148,8A |
| 27 | WM_MOUSEMOVE | 156,8A |
| 28 | WM_NCHITTEST | 162,8A |
| 29 | WM_SETCURSOR | 166,8A |
| 30 | WM_MOUSEMOVE | 174,8A |
| 31 | WM_KEYDOWN | 184,8A |
| 32 | WM_KEYDOWN | 194,8A |
| 33 | WM_CHAR | 204,8A |
| 34 | WM_KEYUP | 214,8A |
| 35 | WM_KEYUP | 224,8A |
| 36 | WM_KEYDOWN | 234,8A |
| 37 | WM_CHAR | 244,8A |

TABLE 3-continued

SENT MESSAGE FILE

| 38 | WM_KEYUP | 254,8A |
|---|---|---|
| 39 | WM_KEYDOWN | 264,8A |
| 40 | WM_CHAR | 274,8A |
| 41 | WM_KEYUP | 284,8A |
| 42 | WM_KEYDOWN | 294,8A |
| 43 | WM_CHAR | 304,8A |
| 44 | WM_KEYUP | 314,8A |
| 45 | WM_KEYDOWN | 324,8A |
| 46 | WM_CHAR | 334,8A |
| 47 | WM_KEYUP | 344,8A |
| 48 | WM_SYSKEYDOWN | 354,8A |
| 49 | WM_SYSKEYDOWN | 364,8A |
| 50 | WM_SYSCOMMAND | 374,8A |
| 51 | WM_CLOSE | 376,8A |
| 52 | WM_WINDOWPOSCHANGING | 378,8A |
| 53 | WM_WINDOWPOSCHANGED | 382,8A |
| 54 | WM_NCACTIVATE | 386,8A |
| 55 | WM_ACTIVATE | 390,8A |
| 56 | WM_ACTIVATEAPP | 394,8A |
| 57 | WM_KILLFOCUS | 398,8A |
| 58 | WM_DESTROY | 402,8A |
| 59 | WM_NCDESTROY | 406,8A |

TABLE 4

POSTED MESSAGE FILE1

| 1 | WM_MOUSEMOVE | 136,123,8A |
|---|---|---|
| 2 | WM_MOUSEMOVE | 154,141,8A |
| 3 | WM_MOUSEMOVE | 172,159,8A |
| 4 | WM_KEYDOWN | 182,177,8A |
| 5 | WM_KEYDOWN | 192,187,8A |
| 6 | WM_CHAR | 202,197,8A |
| 7 | WM_KEYUP | 212,207,8A |
| 8 | WM_KEYUP | 222,217,8A |
| 9 | WM_KEYDOWN | 232,227,8A |
| 10 | WM_CHAR | 242,237,8A |
| 11 | WM_KEYUP | 252,247,8A |
| 12 | WM_KEYDOWN | 262,257,8A |
| 13 | WM_CHAR | 272,267,8A |
| 14 | WM_KEYUP | 282,277,8A |
| 15 | WM_KEYDOWN | 292,287,8A |
| 16 | WM_CHAR | 302,297,8A |
| 17 | WM_KEYUP | 312,307,8A |
| 18 | WM_KEYDOWN | 322,317,8A |
| 19 | WM_CHAR | 332,327,8A |
| 20 | WM_KEYUP | 342,337,8A |
| 21 | WM_SYSKEYDOWN | 352,347,8A |
| 22 | WM_SYSKEYDOWN | 362,357,8A |
| 23 | WM_SYSCOMMAND | 372,367,8A |

Figure 11:
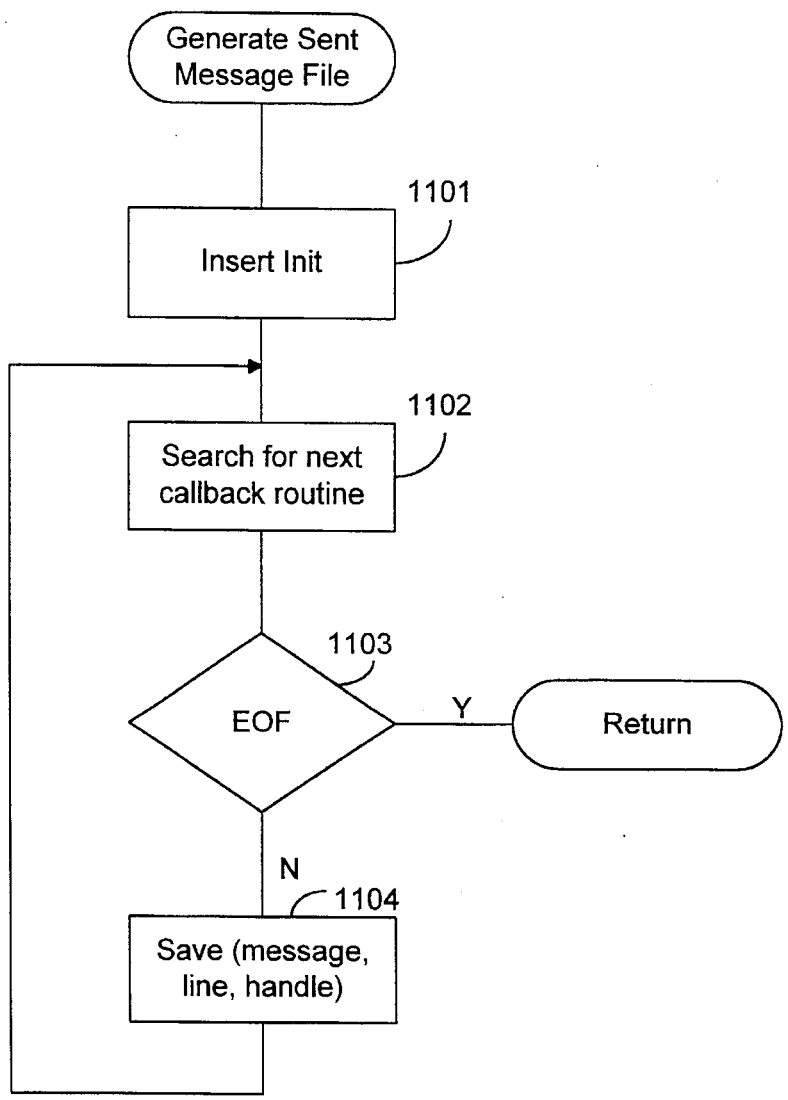
FIG. 11 is a flow diagram of the routine GenerateSentMessageFile.

FIG. 11 is a flow diagram of the routine GenerateSentMessageFile. The sent message file is generated to improve the processing efficiency of the SGAEngine routine. In step 1101, the routine writes an initialization message (INIT) to the sent message file. This initialization message is used as an indication to initialize the SGAEngine routine. In steps 1102 through 1105, the routine loops searching for invocations of a callback routine and writes entries to the sent message file. In step 1102, the routine searches the log file for the next entry corresponding to the invocation of a callback routine. In step 1103, if the end of the log file is reached, then the routine returns, else the routine continues at step 1104. In step 1104, the routine writes the message, the line number of the entry, and the handle of the resource to which the message is directed to the sent message file and loops to step 1101.

Figure 12:
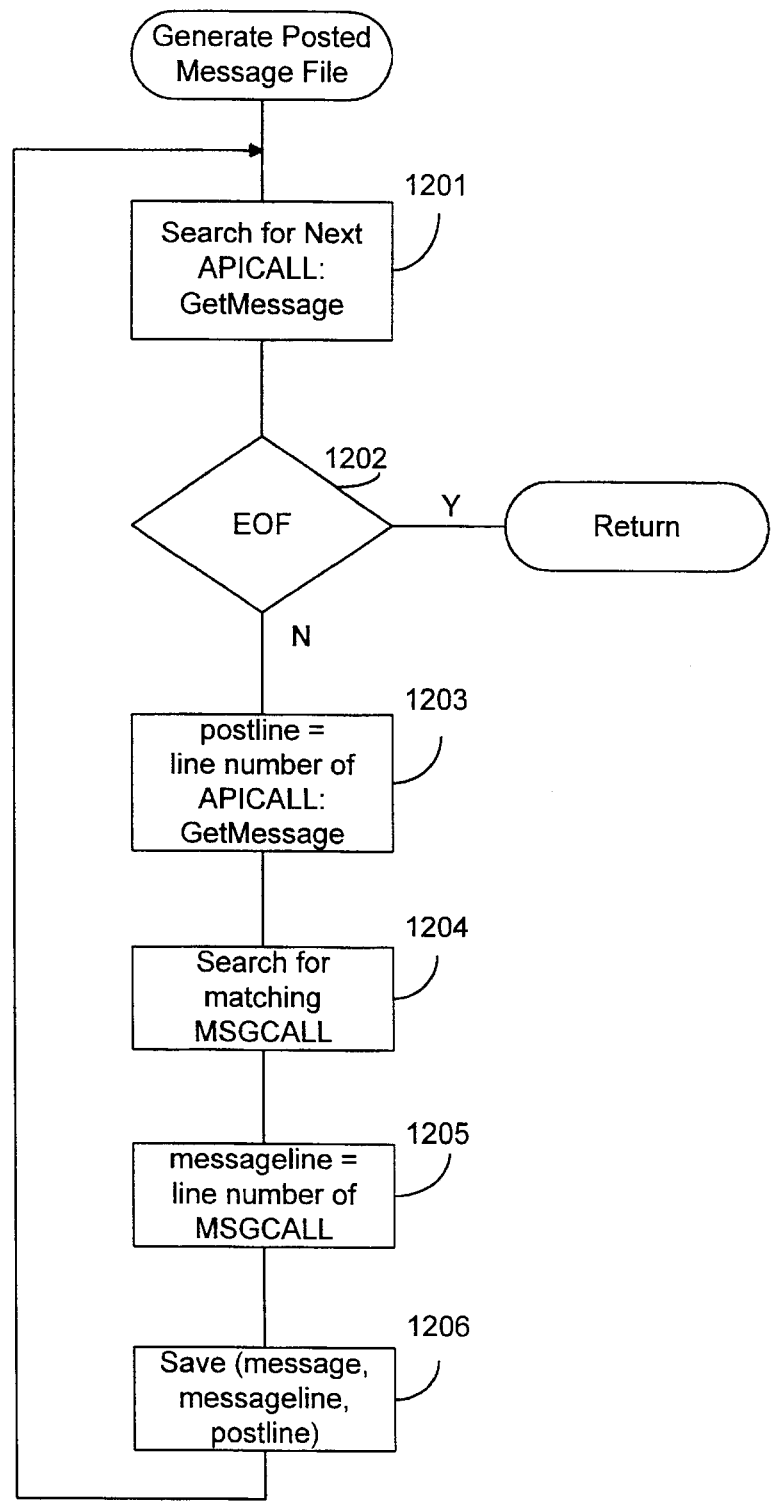
FIG. 12 is a flow diagram of the routine GeneratePostedMessageFile.

FIG. 12 is a flow diagram of the routine GeneratePostedMessageFile. This routine searches the log file for each posted message and determines when the posted message should be simulated by the SGA. In step 1201, the routine searches for the next invocation of the function GetMessage, which retrieves posted messages in the log file, or function PeekMessage, which looks at posted messages and may or may not retrieve them. In step 1202, if the end of the log file is reached, then the routine returns, else the routine continues at step 1203. In step 1203, the routine records the line number in the log file corresponding to the invocation of the function GetMessage or PeekMessage. This line number indicates the point at which the event corresponding to the posted message should be simulated. For example, if the posted message is WM_KEYDOWN, then the WM_KEYDOWN message should be simulated before the SGA simulates the execution of the function GetMessage that retrieves the WM_KEYDOWN message or before the execution of the function PeekMessage, which may or may not have noticed its presence in the message queue. In step 1204, the routine searches the log file for an entry corresponding to the invocation of a callback routine that matches the posted message. That is, the invocation of the callback routine through which the posted message was sent to the application program. In step 1205, the routine records the line number of the entry in the log file corresponding to the invocation of the callback routine. In step 1206, the routine writes the message, message line number, post line number, and the handle of the resource to which the message is directed to the posted message file and loops to step 1201. In an alternate embodiment, the sent message and posted message files are generated during a single pass of the log file. Also, the sent message and posted message files need not be generated, rather the information can be determined from the log file as the simulation proceeds.

Figure 13:
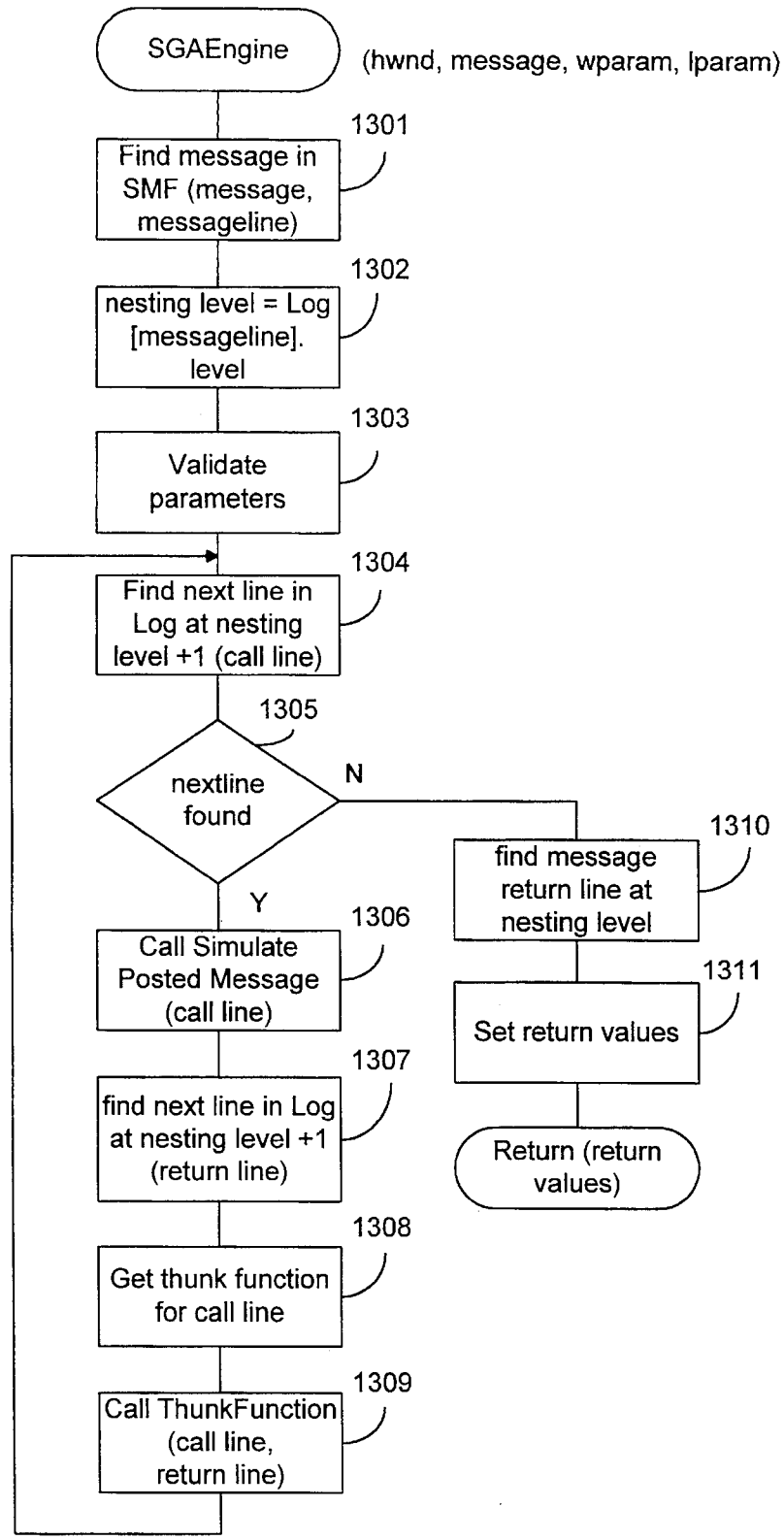
FIG. 13 is a flow diagram of the SGAEngine routine.

FIG. 13 is a flow diagram of the SGAEngine routine. This routine is passed a window handle and a message. The routine simulates the application program processing of that message as recorded in the log file. The routine determines which entry in the log file corresponds to the passed message. In a preferred embodiment, this determination selects the first entry in the log file of a message of the same type as the passed message and with the same handle to a resource. The routine then simulates the execution of the application program that occurs in response to the receipt of the message. The execution that occurs in response is represented by the entries in the log file that are nested within the invocation of the callback routine that processes the message. The SGAEngine routine is called recursively to process nested messages. To initiate the SGAEngine routine, a dummy entry is stored at line number 0 in the log file at nesting level 0 and corresponding to the sending of the message INIT. The SGAEngine routine simulates execution of all entries in the log file nested within nesting level 0, which is the entire log file. In step 1301, the routine finds the message in the sent message file that corresponds to the passed message and records that message line. In step 1302, the routine determines the nesting level of the found message. In step 1303, the routine validates the passed parameters. In step 1304, the routine searches for the next line in the log file that corresponds to an invocation of a function within the callback routine that processed the passed message. The routine records that line number as the call line. For example, if the passed message corresponds to the message at line number 8 of the log file, then line number 9 contains a nested function invocation. In step 1305, if the routine finds a next line, then the routine continues at step 1306, else the routine continues at step 1310. In step 1306, the routine invokes routine SimulatePostedMessage to simulate the posting of a message, if appropriate. In step 1307, the routine finds the line corresponding to the return of the nested function invocation. In step 1308, the routine retrieves or identifies the thunk function for the nested function. In step 1309, the routine invokes the thunk function and loops to step 1304. In step 1310, the routine finds the return line associated with the invocation line of the message found in step 1301. In step 1311, the routine sets the appropriate return values and returns.

Figure 14:
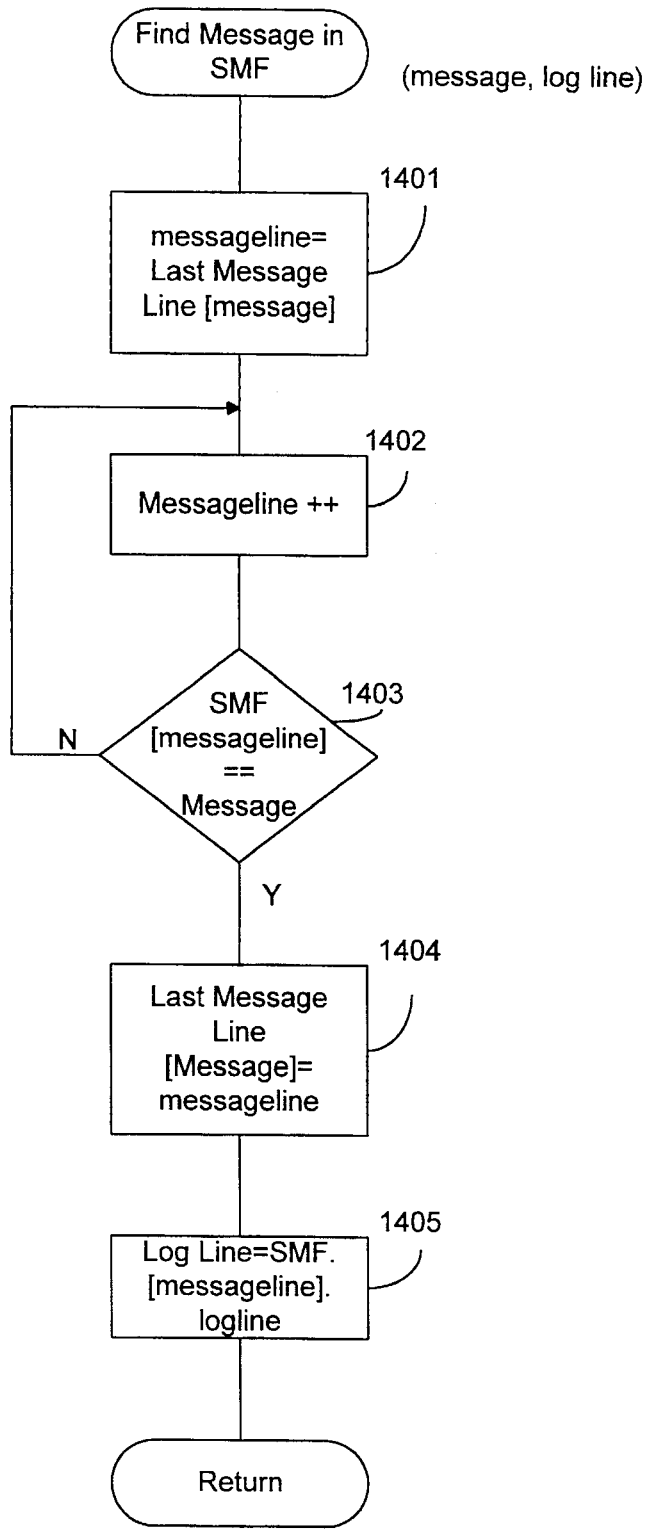
FIG. 14 is a flow diagram of the routine FindMessageInSentMessageFile.

FIG. 14 is a flow diagram of the routine FindMessageInSentMessageFile. This routine is passed a message and a resource (window) handle. This routine finds the next message in the sent message file that corresponds to the passed message for the passed resource handle. The routine returns the line number in the log file of the message. The routine maintains an array to track the last entry in the sent message file found for each message type for each resource handle. The routine starts the search from the last entry. In step 1401, the routine retrieves the message line of the last message found in the sent message file for the passed resource handle of the passed message type. In steps 1402 through 1403, the routine loops searching the sent message file for the next message of the passed message type for the passed resource handle. In step 1402, the routine increments the message line. In step 1403, if the message of the message line in the sent message file equals the passed message type and passed resource handle, then the routine continues at step 1404, else the routine loops to step 1402. In step 1404, the routine sets the last message line number for the passed message type and passed resource handle to the message line. In step 1405, the routine retrieves the line number in the log file of the entry corresponding to the invocation of the callback routine to process the passed message and returns.

Figure 15:
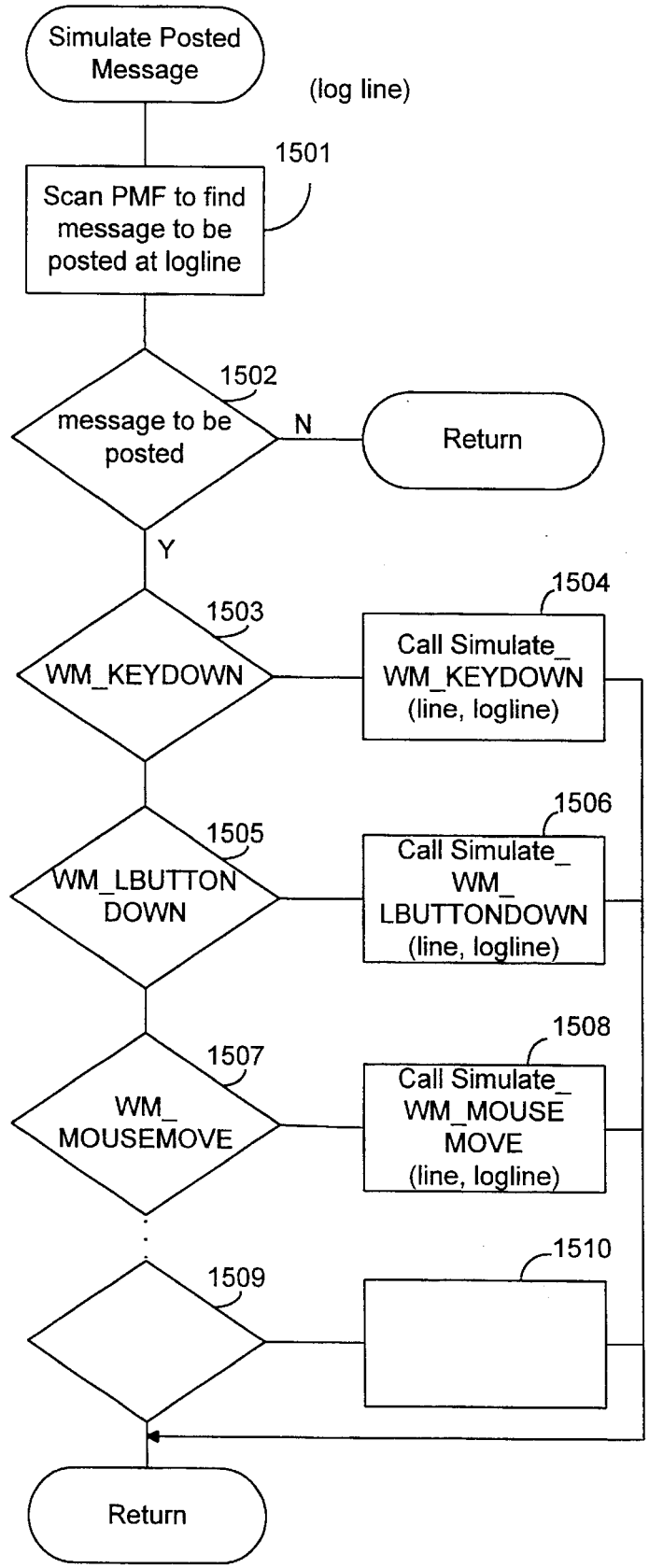
FIG. 15 is a flow diagram of the routine SimulatePostedMessage.

FIG. 15 is a flow diagram of the routine SimulatePostedMessage. This routine scans the posted message file to determine if the posting of a message should be simulated before the SGA simulates the execution of the function corresponding to the entry in the log file at the passed line number. The routine then simulates the posting of the message, if appropriate. In step 1501, the routine scans the posted message file to determine whether a message should be posted before simulation of the entry at the passed line number in the log file. In step 1502, if a message should be posted, the routine continues at step 1503, else the routine returns. In step 1503 through 1510, the routine determines which message should be posted and calls the appropriate routine to simulate the posting of the message and the routine then returns.

Figure 16:
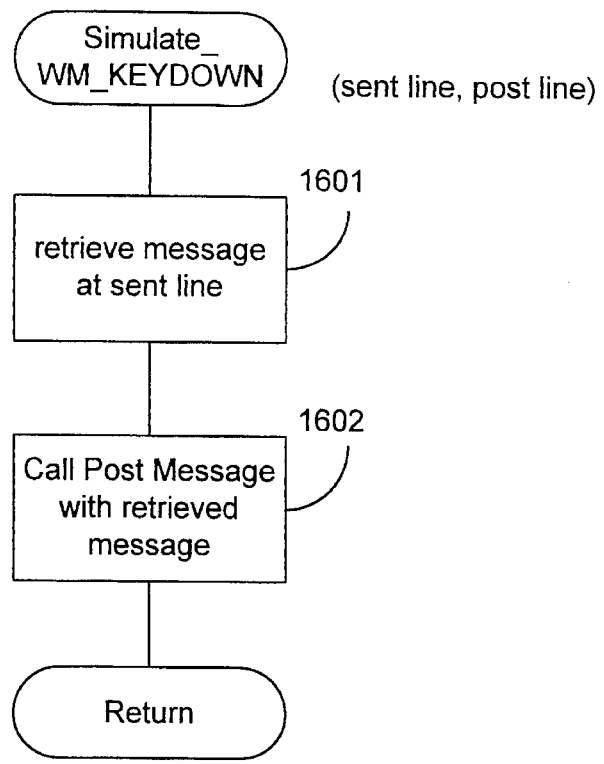
FIG. 16 is a flow diagram of a routine that simulates the posting of the WM_KEYDOWN message.

FIG. 16 is a flow diagram of a routine that simulates the posting of the WM_KEYDOWN message. The routine is passed the sent line corresponding to the invocation of the callback routine and the post line number corresponding to the line number before which the message should be posted. In step 1601, the routine retrieves the message at sent line from the log file. In step 1602, the routine calls the function PostMessage of the new operating system or its equivalent to post the retrieved WM_KEYDOWN message and the routine returns.

Figure 17:
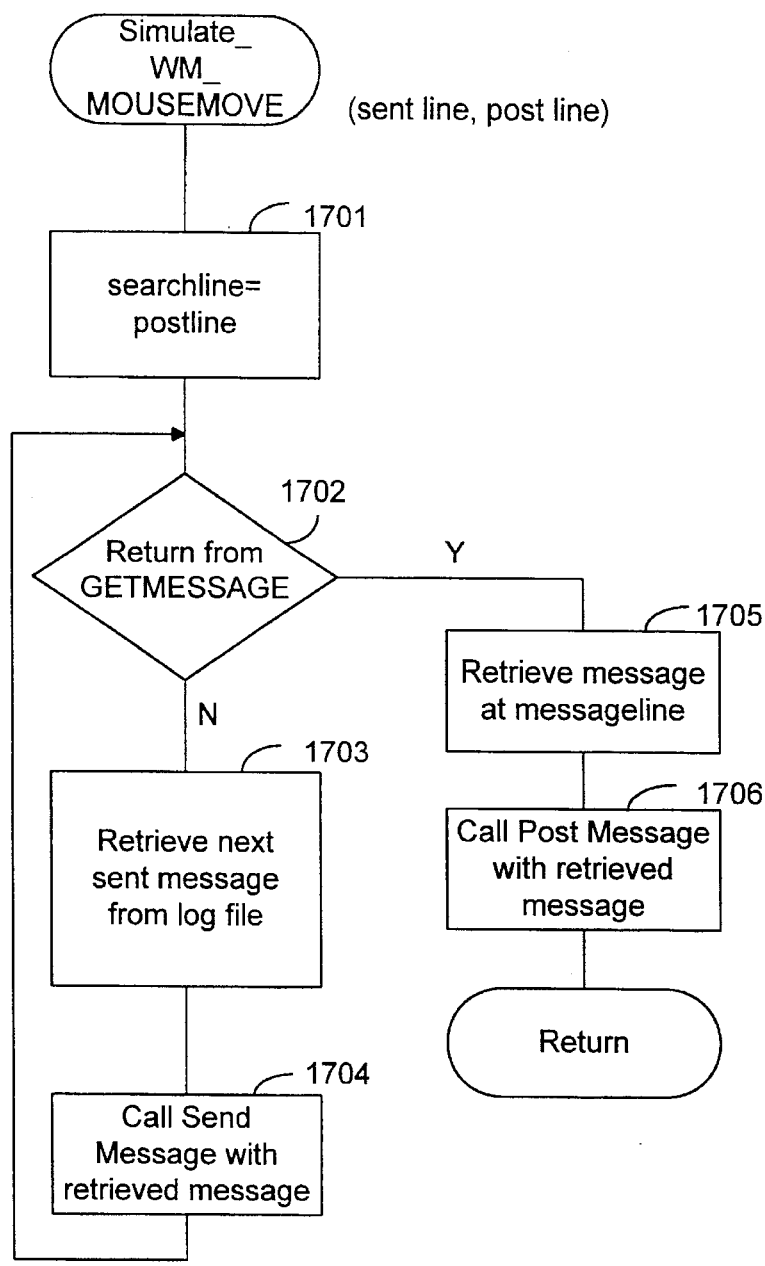
FIG. 17 is a flow diagram of a routine that simulates a WM_MOUSEMOVE message.

FIG. 17 is a flow diagram of a routine that simulates a WM_MOUSEMOVE message. The routine is passed the sent line number in the log file of the entry corresponding to the invocation of the callback routine and the post line number corresponding to the line number before which the posting of the message should be simulated. To simulate a WM_MOUSEMOVE message, the routine simulates the sent messages that were sent during the invocation of the function GetMessage that retrieved the posted WM_MOUSEMOVE message. The routine then posts the WM_MOUSEMOVE message to the new operating system. For example, line number 136 of the log file corresponds to the sending of a WM_MOUSEMOVE message and line number 123 corresponds to the line before which the posting of the WM_MOUSEMOVE message should be simulated. To simulate the WM_MOUSEMOVE message, the sending of the WM_NCHITTEST message at line 124 and the sending of the WM_SETCURSOR message at line 128 should be simulated. This routine uses the function SendMessage (or its equivalent) in the new operating system to send these messages. The thunk callback routines are then invoked by the new operating system to send the message to the SGA. After the messages are sent, then the SGA posts the WM_MOUSEMOVE message by invoking the function PostMessage (or its equivalent) in the new operating system. In steps 1701 through 1704, the routine retrieves each sent message and sends the message to the new operating system. In step 1701, the routine sets the start of the search at the post line. In step 1702, if the search line in the log file indicates the return from the invocation of the function GetMessage at the post line, then the routine continues at step 1705, else the routine continues at step 1703. In step 1703, the routine retrieves the next sent message from the log file. In step 1704, the routine calls the function SendMessage of the new operating system with the retrieved message and loops to step 1702. In step 1705, the routine retrieves the message corresponding to the return from the invocation of the function GetMessage at the post line. In step 1706, the routine calls the function PostMessage of the new operating system with the retrieved message and returns. Alternatively, the routine that simulates a WM_MOUSEMOVE message could invoke a function SetCursorPos of the new operating system, which effectively simulates a WM_MOUSEMOVE message.

Figure 18:
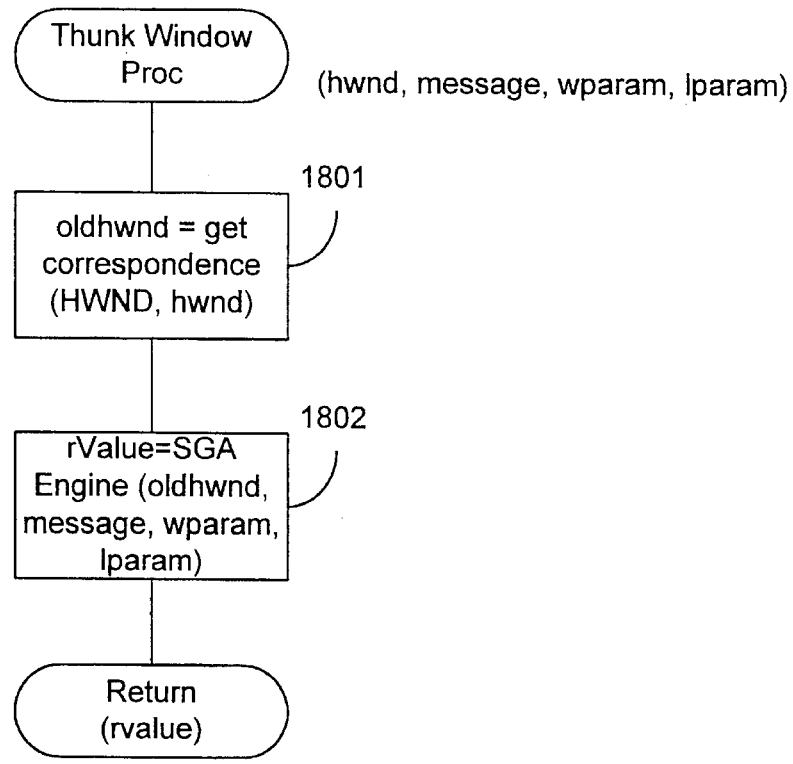
FIG. 18 is a flow diagram of a thunk window procedure.

FIG. 18 is a flow diagram of a thunk window procedure. Each thunk callback routine operates in a similar way. In step 1801, the routine determines which old window handle corresponds to the window handle passed by the new operating system. The new operating system uses handles that do not necessarily correspond to the actual handles used by the old operating system. Consequently, the SGA maintains a mapping between handles of the old operating system and corresponding handles in the new operating system. In step 1802, the routine invokes the SGAEngine routine to simulate the processing of the window procedure by the application program and returns.

Figure 19:
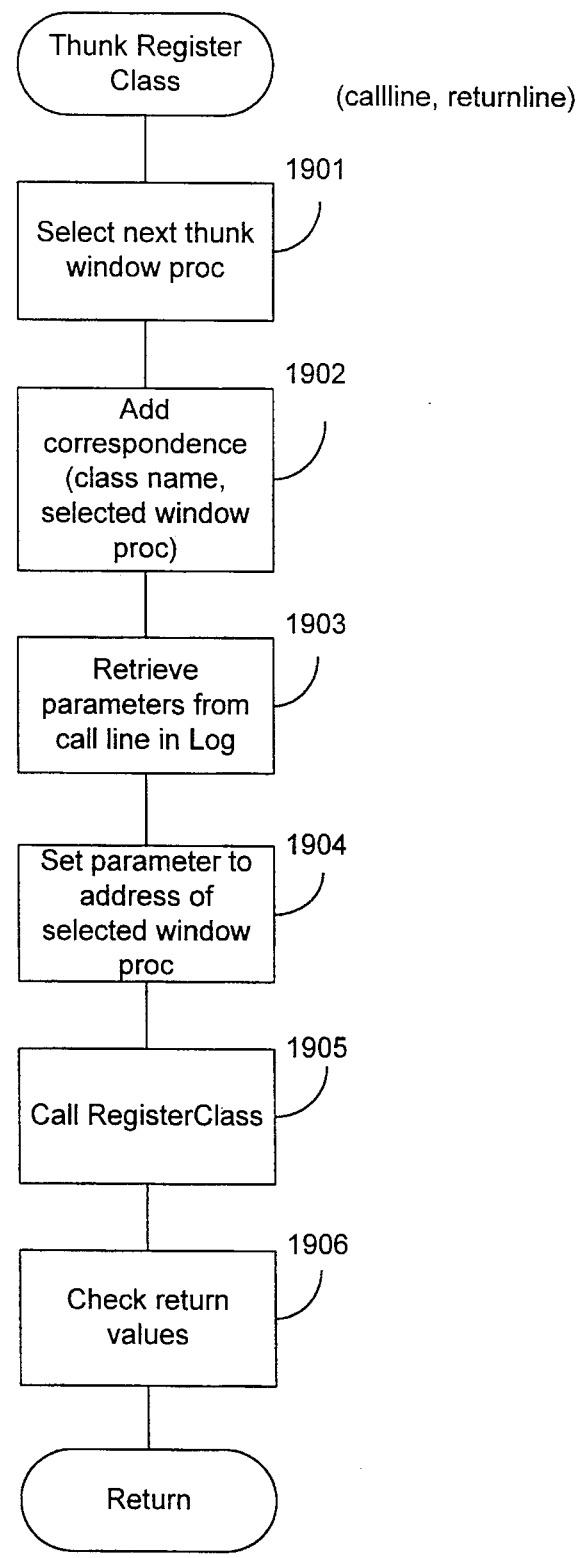
FIG. 19 is a flow diagram of the routine ThunkRegisterClass.

FIG. 19 is a flow diagram of the routine ThunkRegisterClass. In step 1901, the routine selects the next unused thunk window procedure. In step 1902, the routine establishes a correspondence between the class name and the selected thunk window procedure. Every time a window is created of this class, the selected window procedure is used as the thunk window procedure based on this correspondence. In step 1903, the routine retrieves the parameters for the invocation of the function RegisterClass from the log file at the line number indicated by the passed call line. In step 1904, the routine sets the address of the window procedure to that of the selected thunk window procedure. In step 1905, the procedure calls the function RegisterClass of the new operating system. In step 1906, the routine determines if the return values of the invocation of function RegisterClass for the new operating system corresponds to the return values of the invocation of the function RegisterClass for the old operating system as indicated by the return line in the log file and reports an error message if they do not correspond. The routine then returns.

Figure 20:
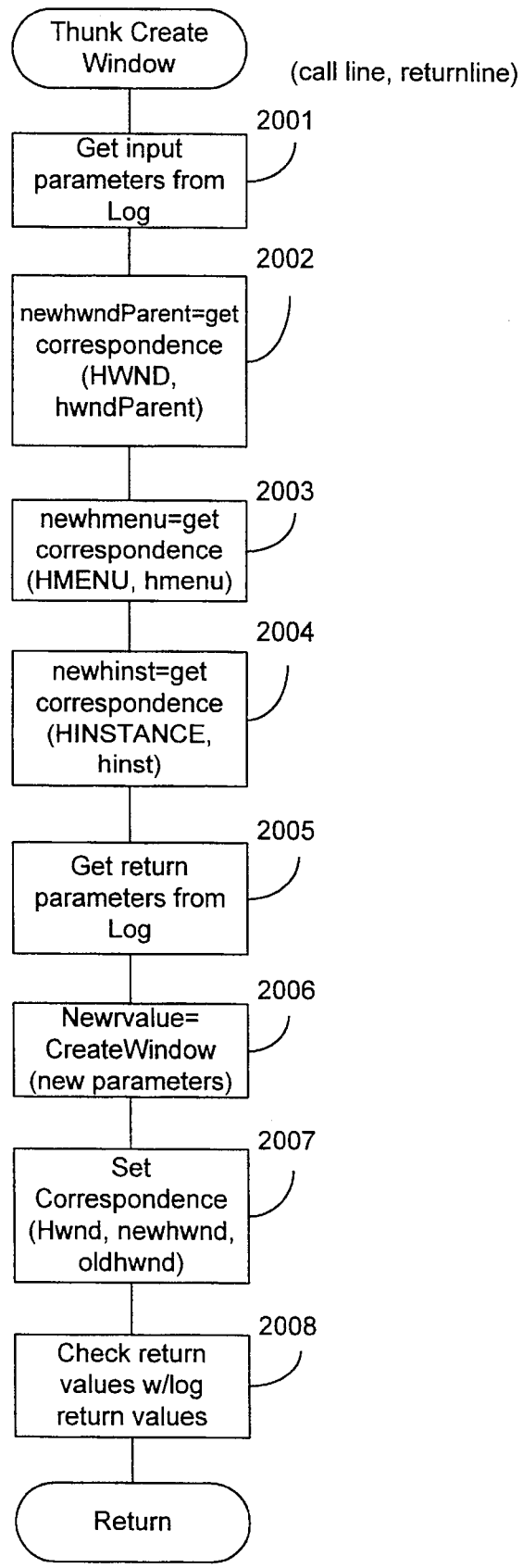
FIG. 20 is a flow diagram of the routine ThunkCreateWindow.

FIG. 20 is a flow diagram of the routine ThunkCreateWindow. In step 2001, the routine retrieves the passed parameters for the invocation of function CreateWindow from the log file at the line number indicated by the passed call line. In step 2002, the routine determines the new window handle for the passed parent window, if one has been assigned. In step 2003, the routine determines the new menu handle of the passed menu, if one has been assigned. In step 2004, the routine determines the new handle for the instance of this application, the SGA. In step 2005, the routine gets the return parameters from the log file at the line number indicated by the passed return line. In step 2006, the routine calls the function CreateWindow of the new operating system passing the new parameters (e.g., new handles). In step 2007, the routine establishes the correspondence between the new handle returned by the new operating system and the old handle used by the old operating system as indicated by the return parameters in the log file. In step 2008, the routine determines whether the return parameters from the invocation of the function CreateWindow of the new operating system corresponds to the return parameters of the invocation of function CreateWindow in the old operating system as indicated by the return line in the log file and reports an error if they do not correspond. The routine then returns.

Figure 21:
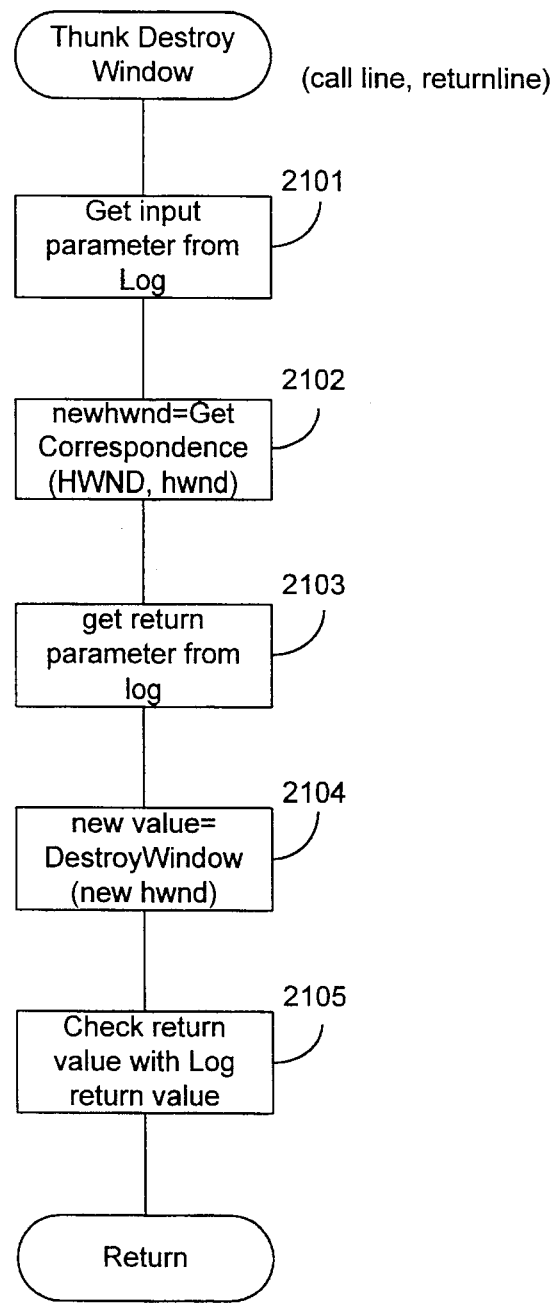
FIG. 21 is a flow diagram of the procedure ThunkDestroyWindow.

FIG. 21 is a flow diagram of the procedure ThunkDestroyWindow. In step 2101, the routine retrieves the passed parameters from the log file at the line number indicated by the passed call line. In step 2102, the routine determines the new window handle that corresponds to the old window handle. In step 2103, the routine retrieves the returned parameters from the log file at the line number indicated by the passed return line. In step 2104, the routine invokes the function DestroyWindow of the new operating system. In step 2104, the routine compares the return value of the invocation of the function DestroyWindow of the new operating system with the invocation of the function DestroyWindow of the old operating system as indicated by the retrieved return parameters and reports an error if there is a difference. The routine then returns.

Figure 22:
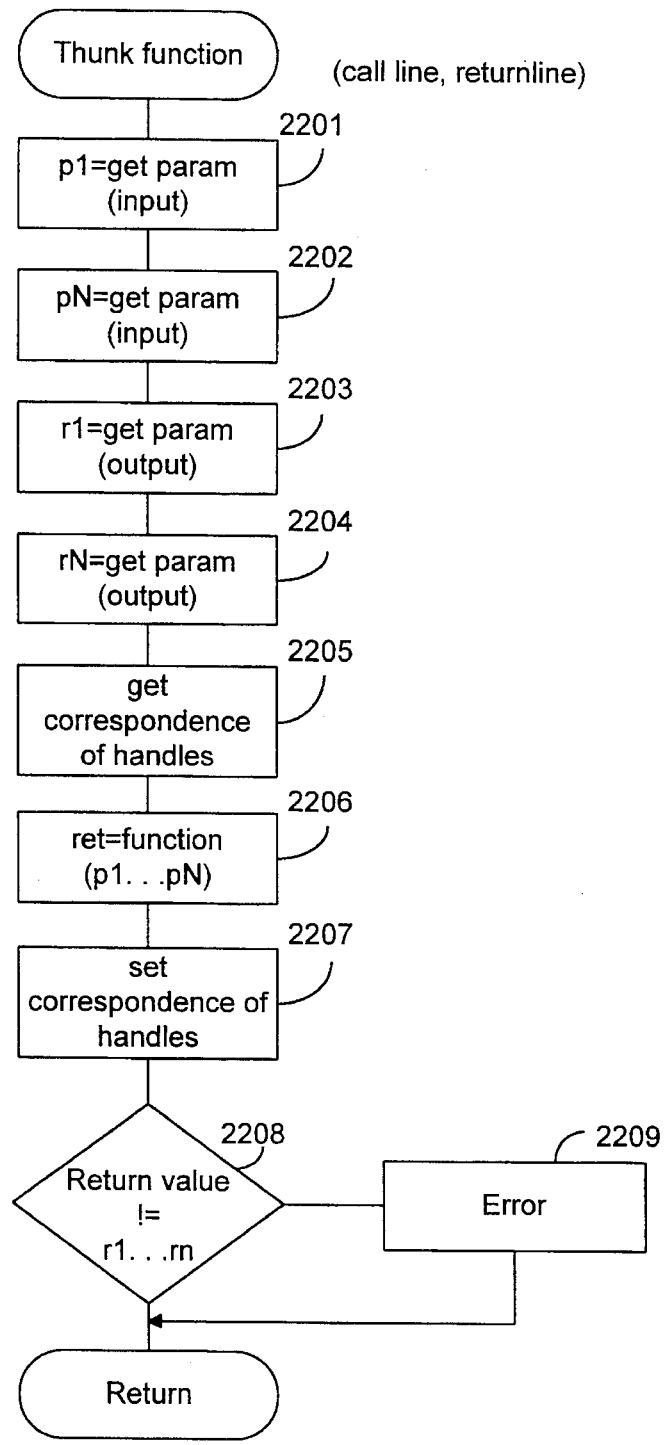
FIG. 22 is a flow diagram of a template thunk function.

FIG. 22 is a flow diagram of a template thunk function. The thunk function is passed the line number in the log file corresponding to an invocation (call line) and return (return line) of the function. In steps 2201 through 2202, the thunk function retrieves the passed parameters from the log file. In steps 2203 through 2204, the thunk function retrieves the returned parameters from the log file. In step 2205, the thunk function retrieves the new handles that correspond to any old handle passed as a parameter. In step 2206, the routine invokes functions to simulate the function in the old operating system in the new operating system. In step 2207, the thunk function sets the correspondence between any new handles returned by the new operating system and the old handles of the old operating system. In step 2208, if the returned parameters from the simulated function do not correspond to the return parameters from the log file, then an error is reported in step 2209 and then the routine returns.

Figure 23:
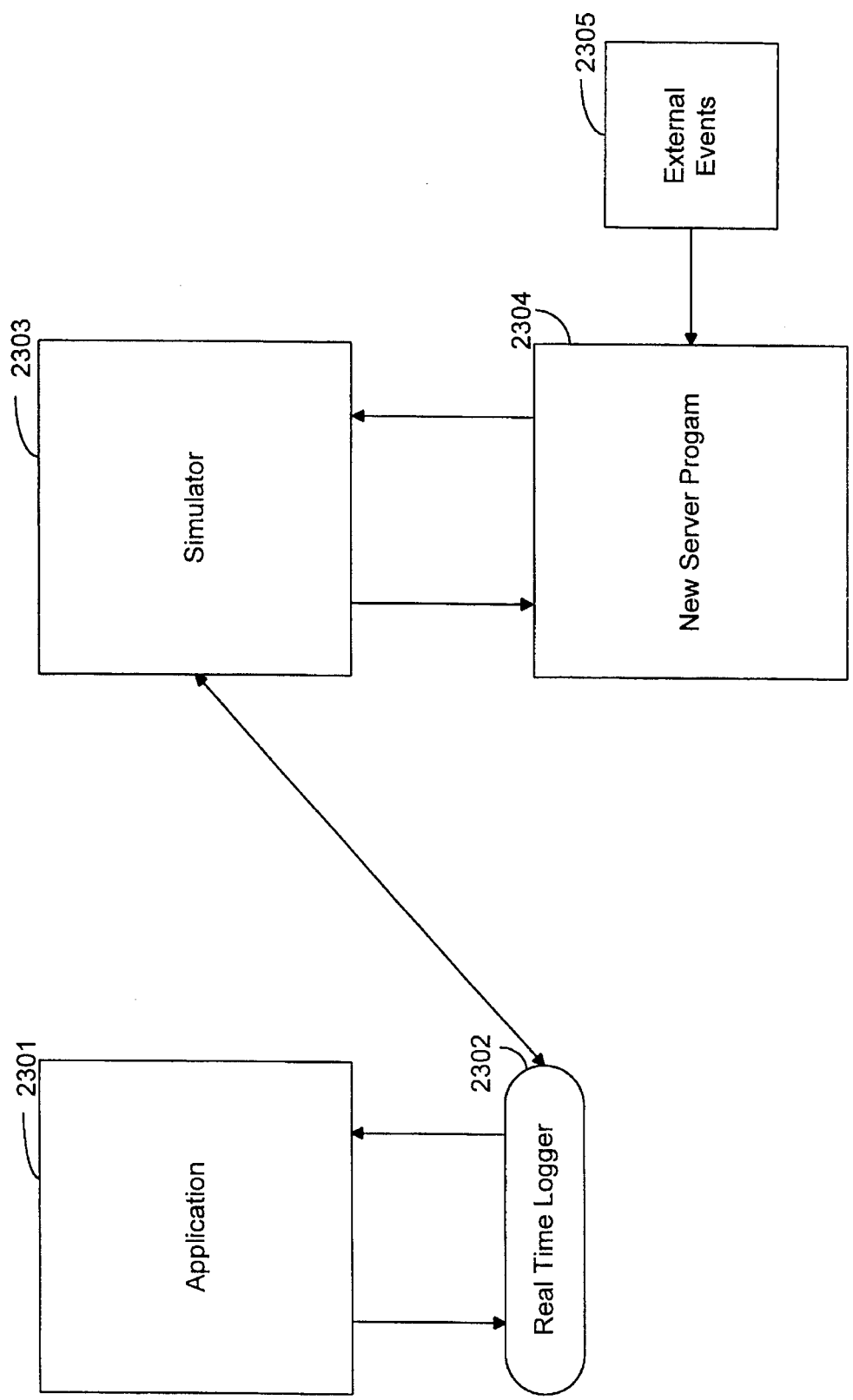
FIG. 23 is a block diagram illustrating an alternate embodiment of the present invention.

FIG. 23 is a block diagram of an alternate embodiment of the present invention. A real-time logger 2302 intercepts service requests (function calls) of an application program 2301 intended for an old server program and sends the request to a simulator program 2303. The simulator program maps the received requests to service requests of the new server program 2304. The new server program performs these requests and passes results through the simulator to the real-time logger, which returns to the application program. Similarly, when the new server program invokes a callback routine, the simulator program routes the invocation to the logger which invokes the appropriate callback routine of the application program. The new server program inputs external events and routes indicators of events to the application program through the simulator and real-time logger.

One skilled in the art would appreciate that methods and systems of the present invention can be used to simulate the execution of programs that use an API provided by other than an operating system in conjunction with a graphical user interface. For example, a database system (server program) may provide various functions that comprise its API. The interaction between application programs (client program) and the database system can be recorded during an execution of the application program. This recorded interaction can then be used to simulate the application program and to test a new database system.

One skilled in the art would also appreciate that the new operating system could be simply the old operating system with certain functions rewritten, enhanced, or modified. In this case, although existing application programs can execute under the new operating system, the simulation system can be used to check the parameters returned by functions of the new operating system and parameters passed to callback routines by the new operating system.

One skilled in the art would further appreciate that the present invention can be used to compare the performance of a client program developed to request services of a first server program with simulated performance on a second server program. To compare performances, the client program is executed and a log is generated. The execution is simulated on both the first and second server programs and performance characteristics are recorded. The performance characteristics include simulation overhead for both server programs to provide a normalized basis for comparison. Alternatively, a similar approach can be used to compare the performance with a third server program.

Although the present has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method in a computer system of simulating an execution of a computer program, the computer program developed for invoking operating system functions of a first operating system, each operating system function for performing a behavior in accordance with passed parameters, the method comprising the steps of:

under the control of the first operating system, generating a log during the execution of the computer program, the log including an indication of each invocation of an operating system function by the computer program and an indication of each parameter passed to the operating system function by the computer program; and under the control of a second operating system, for each indication of an invocation of an operating system function in the log, invoking an operating system function of the second operating system to perform a behavior similar to the behavior performed by the invocation of the operating system function of the first operating system in accordance with the passed parameters.

2. The method of claim 1 wherein the step of generating a log includes the step of for each invocation of an operating system function, adding to the log an indication of parameters returned by the operating system function; and including the step of upon returning from the invocation of an operating system function of the second operating system comparing the returned parameters with the returned parameters of the log, whereby differences in the returned parameters indicate a difference in behavior of the operating system function of the first operating system and the operating system function of the second operating system.

3. A method in a computer system for simulating an execution of a client program, the client program for invoking functions of a first server program, the client program specifying parameters for identifying variations in behavior of invoked functions, the method comprising the steps of:

during execution of the client program, logging a plurality of invocations made by the client program of functions of the first server program, each invocation including an identification of the function and any parameters specified with the invocation; and invoking functions of a second server program to perform a behavior similar to behavior performed by the first server program based on the logged invocations whereby behavior of the client computer program is simulated.

4. The method of claim 3 wherein the step of invoking functions of the second server program to perform a behavior includes the steps of:

for each of a plurality of logged invocations,
    selecting one or more functions of the second server program to simulate behavior of the logged invocation; and
    invoking the selected functions of the second server program to effect simulation of the behavior of the logged invocation.

5. The method of claim 4 wherein the step of invoking the selected functions of the second server program includes the step of passing to the second server program any parameters specified with the logged invocation.

6. The method of claim 5 including the step of before passing a parameter to a function of the second server program, mapping the parameter from a parameter generated by the first server program to a parameter generated by the second server program.

7. The method of claim 6 wherein the step of mapping includes the step of mapping a computer system generated handle.

8. The method of claim 3 wherein the step of invoking functions of the second server program to perform a behavior includes the steps of:

associating a thunk function with each function provided by the first server program, each thunk function having a prototype similar to the prototype of the associated function of the first server program; and invoking the thunk function associated with the function of a logged request to simulate behavior of the logged request.

9. The method of claim 8 wherein the step of invoking the thunk function includes the step of passing a parameter analogous to a parameter of the logged request.

10. The method of claim 9 including the step of before passing a parameter to the second server program, mapping the parameter from a parameter generated by the first server program to a parameter generated by the second server program.

11. The method of claim 8 including the step of:

during the invocation of the thunk function, invoking one or more functions of the second server program to simulate the behavior of the function associated with the thunk function.

12. The method of claim 11 including the step of:

upon return from a function of the second server program, specifying return parameters to be returned by the thunk function.

13. The method of claim 3 wherein the step of logging a plurality of invocations made by the client program of functions of the first server program includes the step of logging each return from an invoked function, each logged return including an identification of the invoked function and any parameter returned by the invoked function.

14. The method of claim 3 wherein the step of logging a plurality of invocations made by the client program of functions includes the step of sending indications of the invocations to a simulation program that controls the invoking of functions of the second server program.

15. The method of claim 3 wherein the step of logging includes logging invocations of callback routines of the client program, and including associating a thunk callback routine with each callback routine wherein the thunk callback routine simulates behavior of the associated callback routine when invoked by the first server program.

16. The method of claim 3 wherein the first server program is an operating system and the second server program is a different version of the same operating system.

17. The method of claim 1 wherein the first server program is an operating system and the second server program is a different operating system.

18. A method in a computer system for comparing performance between execution of a client program with a first server program and execution of the client program with a second server program, the client program for requesting services of a third server program by invoking functions of the third server program, the method comprising the steps of:

during an execution of the client program, logging a plurality of invocations made by the client program of functions of the third server program, each invocation including an identification of the function;

simulating the execution of the client program with the first server program by selecting logged invocations, invoking functions of the first server program, and recording characteristics of performance of the invoked function of the first server program;

simulating the execution of the client program with the second server program by selecting logged invocations, invoking functions the second server program and recording characteristics of performance of the invoked function of the second server program; and analyzing the recorded characteristics of the performance of the invoked functions of the first server program and the second server program.

19. The method of claim 18 wherein the steps of recording the performance characteristics record timing information.

20. The method of claim 19 wherein the step of simulating the execution of the client program with the first server program are performed on a first computer and the step of simulating the execution of the client program with the second server program is performed on a second computer, the first computer and the second computer having different architectures.

21. The method of claim 20 wherein the step of logging is performed on a third computer having an architecture different from the architecture of the first computer and the second computer.

22. A method in a computer system for cooperatively executing a client program with a second server program, the client program developed for requesting services of a first server program by invoking functions of the first server program, the client program specifying a function name and parameters for each invoked function, the method comprising the steps of:

during an execution of the client program on the computer system,
intercepting a plurality of invocations made by the client program of functions of the first server program, each invocation including a function name and parameters; and
sending each intercepted invocation to a mapping program;

upon receipt of a sent invocation by the mapping program, invoking a function of the second server program to perform behavior represented by the sent invocation; and sending to the client program any parameters returned by the second server program whereby the client program continues execution.

23. The method of claim 22 wherein the client program executes on a first computer and the second server program executes on a second computer.

24. The method of claim 22 wherein the step of invoking a function of the second server program to perform a behavior includes the steps of:

for a plurality of sent invocations,
selecting one or more functions of the second server program to simulate behavior represented by the sent invocation; and
invoking functions of the second server program to perform behavior represented by the sent invocation.

25. A computer system for simulating an execution of an application computer program, the application computer program for requesting services of an original computer program by invoking functions of the original computer program, the execution of the application program being logged as invocations made by the application computer program of functions of the original computer program, the execution of the application computer program being simulated in conjunction with a different computer program, the computer system comprising:

means for inputting the logged invocations of functions of the original computer program;
means for mapping the logged invocations to analogous invocations of functions of the different computer program; and
means for invoking the functions of the different computer program to perform the behavior analogous to the logged invocations of functions to effect the simulation of the execution of the application program.

26. The computer system of claim 25 further comprising means for mapping parameters logged with the invocations of functions of the original computer program into parameters for the different computer program.

27. The computer system of claim 25 including:
means for simulating external events that occurred during execution of the application computer program.

28. The computer system of claim 25 including:
means for providing thunk callback routines to simulate behavior of callback routines invoked by the original computer program during the execution of the application computer program.

29. A method in a computer system of simulating an execution of a computer program operating in conjunction with a message-driven operating system, the operating system providing a plurality of functions for invocation by the computer program, each function having a behavior, the computer program providing a callback routine for receiving messages sent from the operating system, the method comprising the steps of:

during the execution of the computer program, generating a log of each function invocation by the computer program and of each message sent to a callback routine by the operating system; and after completion of the execution of the computer program,
retrieving each logged function invocation and simulating the behavior of the retrieved function invocation by invoking a function of the operating system, and
specifying a thunk callback routine for each callback routine indicated by the log, the thunk callback routine for receiving messages from the operating system and simulating the execution of the callback routine of the computer program.

30. The method of claim 29 wherein during the execution of the computer program the operating system posts messages to the computer program, the posted messages indicating an external event directed to the computer program, and including the step of when a logged function invocation corresponds to the retrieval of a posted message, invoking a function to simulate the external event.

31. A method in a computer system for comparing the performance between execution of a client program with a first server program and execution of the client program with a second server program, the client program for requesting services of a first server program, the method comprising the steps of:

during an execution of the client program, logging a plurality of requests made by the client program for a service of the first server program, each request including an identification of the requested service;

simulating the execution of the client program with the first server program by selecting logged requests, requesting the first server program to perform the requested behavior of each selected logged request, and recording characteristics of the performance of the request by the first server program;

simulating the execution of the client program with the second server program by selecting logged requests, requesting the second server program to perform the requested behavior of each selected logged request, and recording characteristics of the performance of the request by the second server program; and analyzing the recorded characteristics of the performance of requests by the first server program and the second server program.

32. The method of claim 31 wherein the steps of recording the performance characteristics record timing information.

33. The method of claim 31 wherein the steps of logging and simulating the execution of the client program with the first server program are performed on a first computer and the step of simulating the execution of the client program with the second server program is performed on a second computer, the first computer and the second computer having different architectures.

34. A computer system for simulating an execution of a computer program recorded in a log, the log including an indication of each system function invoked by the computer program during the execution and an indication of each callback routine invoked by the system during the execution, the computer system comprising:

means for retrieving each indication of invocation of a function and a callback routine from the log;

means for receiving a message corresponding to the invocation of a callback routine as indicated in the log;

means for determining which indication of an invocation of a callback routine in the log corresponds to the received message;

means for simulating the execution of each invocation of a function that is nested within the invocation of the determined invocation of the callback routine; and means for specifying a thunk callback routine to the system, the thunk callback routine to simulate the behavior of the callback routine specified during the execution of the computer program.

35. A method in a computer system of simulating an execution of a computer program, the computer program developed for invoking operating system functions of a first operating system, each operating system function for performing a behavior in accordance with passed parameters, the method comprising the steps of:

under the control of the first operating system, generating a log during the execution of the computer program, the log including an indication of each invocation of an operating system function by the computer program and an indication of each parameter passed to the operating system function by the computer program; and under the control of a second operating system, for each indication of an invocation of an operating system function in the log, invoking an operating system function of the second operating system to perform a behavior similar to the behavior performed by the invocation of the operating system function of the first operating system in accordance with the passed parameters.

36. A computer system for simulating an execution of a client program, the client program for requesting services of a first server program by invoking functions of the first server program, the client program specifying parameters for identifying variations in behavior of requested services, the computer system comprising:

means for logging a plurality of invocations made by the client program of functions of the first server program during an execution of the client program, each invocation including an identification of the function; and means for invoking a function of a second server program to perform a behavior similar to behavior performed by the first server program based on the logged invocations whereby behavior of the execution of the client computer program is simulated.

37. A method in a computer system for testing execution of a test server program, the test server program for providing services to client programs, the client programs for requesting services of an established server program by invoking functions of the established server program, the method comprising the steps of:

executing a client program, the client program for requesting services of the established server program by invoking functions of the established server program;

during the execution of the client program, logging a plurality of invocations made by the client program of functions of the established server program, each invocation including an identification of the function;

simulating the execution of the client program with the test server program by selecting logged invocations and invoking functions of the test server program to perform behavior represented by each selected logged invocation whereby performance characteristics of performed behavior indicate whether the test computer program is operating correctly.

38. A method in a computer system of simulating an execution of a computer program recorded in a log, the computer program developed for invoking functions of an operating system and for providing callback routines to be invoked by the operating system, the log including an indication of each invocation of an operating system function by the computer program and an indication of each parameter passed to the operating system function by the computer program, and including an indication of each invocation of a callback routine by the operating system and an indication of each parameter returned to the operating system by the callback routine, the method comprising the steps of:

for each indication of an operating system function invocation in the log, invoking an operating system function to simulate the behavior of the indicated operating system function during the execution of the computer program; and for each callback routine indicated in the log, specifying a thunk callback routine to be invoked by the operating system, wherein, when the thunk callback routine is invoked by the operating system, the thunk callback routine determines the corresponding indication of invocation in the log and simulates the execution of each operating system function invoked during the determined invocation of the callback routine during the execution of the computer program.

39. A method in a computer system of simulating an execution of a computer program developed to execute in conjunction with a message-driven operating system, the operating system providing a plurality of functions for invocation by the computer program, each function having a behavior, the computer program providing a callback routine for receiving messages sent from the operating system, the execution of the computer program represented by a log of each function invocation by the computer program and of each message sent to a callback routine by the operating system, the method comprising the step of:

for each log of a function invocation not nested within an invocation of a callback routine, invoking a function to simulate the behavior of the logged function invocation and when the logged function invocation indicates that the computer program passed an identifier of a callback routine to the operating system, specifying a thunk callback routine when simulating the behavior of the logged function, the thunk callback routine for receiving a sent message from the operating system, for determining which invocation of the callback routine in the log corresponds to the received message, and for each log of a function invocation that is nested within the invocation of the callback routine, invoking a function to simulate the behavior of the logged function.

* * * * *